United States Patent
Webb et al.

(10) Patent No.: US 9,538,467 B2
(45) Date of Patent: Jan. 3, 2017

(54) TELECOMMUNICATIONS SYSTEMS AND METHODS

(71) Applicant: SONY CORPORATION, Tokyo (JP)

(72) Inventors: Matthew William Webb, Basingstoke (GB); Hideji Wakabayashi, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 66 days.

(21) Appl. No.: 14/415,076

(22) PCT Filed: Sep. 13, 2013

(86) PCT No.: PCT/GB2013/052400
§ 371 (c)(1),
(2) Date: Jan. 15, 2015

(87) PCT Pub. No.: WO2014/045016
PCT Pub. Date: Mar. 27, 2014

(65) Prior Publication Data
US 2015/0201376 A1  Jul. 16, 2015

(30) Foreign Application Priority Data

Sep. 21, 2012 (GB) .................................. 1216937.1

(51) Int. Cl.
*G08C 17/00* (2006.01)
*H04W 4/00* (2009.01)
(Continued)

(52) U.S. Cl.
CPC ........ *H04W 52/0209* (2013.01); *H04L 5/0048* (2013.01); *H04L 27/2601* (2013.01);
(Continued)

(58) Field of Classification Search
CPC ............. H04W 52/0209; H04W 24/10; H04W 52/0238; H04W 52/0219; H04L 5/0048; H04L 27/2601; H04L 5/001
See application file for complete search history.

(56) References Cited

U.S. PATENT DOCUMENTS

| 6,633,753 | B1 | 10/2003 | Kido |
| 2008/0165698 | A1* | 7/2008 | Dalsgaard ............. H04W 24/10 370/252 |

(Continued)

FOREIGN PATENT DOCUMENTS

| EP | 2395797 A2 | 12/2011 |
| GB | 2464942 A | 5/2010 |

(Continued)

OTHER PUBLICATIONS

U.S. Appl. No. 14/415,881, filed Jan. 20, 2015, Webb, et al.
(Continued)

*Primary Examiner* — Kiet Tang
(74) *Attorney, Agent, or Firm* — Oblon, McClelland, Maier & Neustadt, L.L.P.

(57) ABSTRACT

A wireless telecommunications system including a base station and a terminal device and employing a radio interface having a downlink radio frame structure including radio subframes including an arrangement of reference symbols for channel estimation. The base station is configured to determine a period of time for which certain terminal device specific data are not scheduled for transmission to the terminal device and to communicate this information to the terminal device through selective suppression of at least one reference symbol. Different reference symbol(s) may be suppressed to indicate different periods of time. The terminal device is configured to monitor the reference symbols transmitted by a base station to identify where reference symbols are suppressed, to determine a period of time for which the terminal device is not expected to receive certain types of (Continued)

data and enter a reduced activity mode for that period to conserve processing and power resources.

45 Claims, 18 Drawing Sheets

(51) Int. Cl.
   *G06F 11/30* (2006.01)
   *H04W 52/02* (2009.01)
   *H04L 5/00* (2006.01)
   *H04L 27/26* (2006.01)
   *H04W 24/10* (2009.01)

(52) U.S. Cl.
   CPC ....... *H04W 24/10* (2013.01); *H04W 52/0238* (2013.01); *Y02B 60/50* (2013.01)

(56) References Cited

U.S. PATENT DOCUMENTS

| | | | |
|---|---|---|---|
| 2011/0176466 A1 | 7/2011 | Lindoff et al. | |
| 2013/0039331 A1* | 2/2013 | Koorapaty | H04L 5/001 370/330 |
| 2013/0194995 A1* | 8/2013 | Reinhardt | H04W 52/0219 370/311 |

FOREIGN PATENT DOCUMENTS

| | | |
|---|---|---|
| GB | 2487757 A | 8/2012 |
| GB | 2487780 A | 8/2012 |
| GB | 2487782 A | 8/2012 |
| GB | 2487906 A | 8/2012 |
| GB | 2487907 A | 8/2012 |
| GB | 2487908 A | 8/2012 |
| GB | 2487909 A | 8/2012 |
| GB | 2488513 A | 9/2012 |
| GB | 2497742 A | 6/2013 |
| GB | 2497743 A | 6/2013 |

OTHER PUBLICATIONS

ETSI TS 122 368 V10.5.0/3GPP TS 22.368 version 10.5.0 Release 10, "Digital cellular telecommunications system (Phase 2+); Universal Mobile Telecommunications System (UMTS); LTE; Service requirements for Machine-Type Communications (MTC); Stage 1," Jul. 2011, cover page and pp. 1-17.

International Search Report issued Dec. 12, 2013 in PCT/GB2013/052400 filed Sep. 13, 2013.

United Kingdom Search Report issued Jan. 3, 2013 in GB1216937.1 filed Sep. 21, 2012.

\* cited by examiner

TELECOMMUNICATIONS SYSTEMS AND METHODS

CROSS-REFERENCE TO RELATED APPLICATIONS

The present application claims priority to British Patent Application 1216937.1, filed in the UK IPO on 21 Sep. 2012, the entire contents of which being incorporated herein by reference.

BACKGROUND OF THE INVENTION

The present invention relates to methods, systems and apparatus for conveying information from a base station to a terminal device in a wireless telecommunications system to control a reduced activity mode at the terminal device to conserve resources.

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a class of devices and applications which, rather than taking advantage of the high data rates available, instead take advantage of the robust radio interface and increasing ubiquity of the coverage area. Examples include so-called machine type communication (MTC) applications, which are typified by semi-autonomous or autonomous wireless communication devices (i.e. MTC devices) communicating small amounts of data on a relatively infrequent basis. Examples include so-called smart meters which, for example, are located in a customer's house and periodically transmit information back to a central MTC server data relating to the customers consumption of a utility such as gas, water, electricity and so on. Further information on characteristics of MTC-type devices can be found, for example, in the corresponding standards, such as ETSI TS 122 368 V10.530 (2011-07)/3GPP TS 22.368 version 10.5.0 Release 10) [1]. Some typical characteristics of MTC type terminal devices/MTC type data might include, for example, characteristics such as low mobility, high delay tolerance, small data transmissions, infrequent transmission and group-based features, policing and addressing.

Whilst it can be convenient for a terminal such as an MTC type terminal to take advantage of the wide coverage area provided by a third or fourth generation mobile telecommunication network there are at present disadvantages. Unlike a conventional third or fourth generation terminal device such as a smartphone, an MTC-type terminal is preferably relatively simple and inexpensive and able to operate on relatively low resources (e.g. low power consumption). The type of functions performed by the MTC-type terminal (e.g. collecting and reporting back data) do not require particularly complex processing to perform, and furthermore are typically not time-critical. However, third and fourth generation mobile telecommunication networks typically employ advanced data modulation techniques on the radio interface which can be power hungry and require more complex and expensive radio transceivers to implement. It is usually justified to include such complex transceivers in a smartphone as a smartphone will typically require a powerful processor to perform typical smartphone type functions. However, as indicated above, there is now a desire to use relatively inexpensive and less complex devices able to operate with low resource usage to communicate using LTE type networks.

Known techniques for lowering power consumption in LTE-type terminal devices include the discontinuous reception (DRX) mode and the microsleep mode. The DRX mode involves controlling a terminal device to enter an idle mode through Radio Resource Control (RRC) signalling. Drawbacks of the DRX mode include reconnection latency as the terminal device moves from idle mode back to connected mode as well as initiation delays and signalling overhead associated with the RRC signalling. These can mean DRX is an efficient mechanism for saving terminal device resources when the device is to be idle for relatively long periods, for example, for hundreds of milliseconds or longer, but the DRX mode is less efficient for controlling shorter duration periods of reduced terminal device activity. The microsleep mode involves a terminal device determining from a control region of a subframe that there is no user-plane data for the terminal device in the remainder of the subframe, and suspending decoding of the remainder of the subframe accordingly. The microsleep mode is thus applicable for timescales which are much shorter than the DRX mode (i.e. microsleep can be applied on a per subframe basis). Furthermore, there is no RRC signalling overhead associated with microsleep. However, the microsleep mode requires a terminal device to decode a control region of each subframe to determine whether to microsleep for the remainder of the subframe and this restricts the extent to which the terminal device can save power. For example, unlike the DRX mode, the microsleep mode cannot be used to configure a terminal device into a continuous reduced-activity state for a number of subframes.

In view of the above-identified drawbacks of existing schemes, there is therefore a need for alternative approaches for controlling a terminal device communicating with a base station to enter a reduced activity mode.

SUMMARY OF THE INVENTION

According to a first aspect of the invention there is provided a method of operating a base station to convey to a terminal device information regarding a period of time for which a type of terminal device specific data is not scheduled for transmission to the terminal device in a wireless telecommunications system employing a radio interface including an arrangement of downlink reference symbols, the method comprising: determining a period of time for which the type of terminal device specific data are not scheduled for transmission to the terminal device; selecting at least one reference symbol from the arrangement of downlink reference symbols in dependence on the determined period of time; and suppressing transmission of the at least one reference symbol to indicate to the terminal device the period of time for which the type of terminal device specific data are not scheduled for transmission to the terminal device.

In accordance with some embodiments the selection of the at least one reference symbol for which transmission is to be suppressed is also based on an association between different ones of the reference symbols and different potential periods of time for which the type of terminal device specific data are not scheduled for transmission to a terminal device.

In accordance with some embodiments the association between different ones of the reference symbols and different potential periods of time for which the type of terminal device specific data are not scheduled for transmission to a terminal device is pre-defined for the wireless telecommunications system.

In accordance with some embodiments the association between different ones of the reference symbols and different potential periods of time for which the type of terminal device specific data are not scheduled for transmission to a terminal device is established by the base station and communicated to the terminal device in prior signalling.

In accordance with some embodiments the association between different ones of the reference symbols and different potential periods of time for which the type of terminal device specific data are not scheduled for transmission to a terminal device is defined in a look-up table.

In accordance with some embodiments the at least one reference symbol for which transmission is to be suppressed comprises more than one reference symbol selected according to a mapping between different combinations of reference symbols and a plurality of potential periods of time for which the type of terminal device specific data are not scheduled for transmission to a terminal device.

In accordance with some embodiments the base station comprises multiple antenna ports for transmitting the reference symbols and the antenna ports for which transmission of the reference symbols is to be suppressed is selected in dependence on the determined period of time for which the type of terminal device specific data are not scheduled for transmission to a terminal device and/or an identity for the terminal device.

In accordance with some embodiments the reference symbols comprise cell-specific reference symbols and/or terminal device specific reference symbols and/or demodulation reference symbols and/or channel state information reference symbols and/or positioning reference symbols.

In accordance with some embodiments the selection of the at least one reference symbol for which transmission is to be suppressed is also based on a start time for the period of time for which the type of terminal device specific data are not scheduled for transmission to the terminal device relative to a time at which the transmission of the at least one reference symbol is to be suppressed.

In accordance with some embodiments the selection of the at least one reference symbol for which transmission is to be suppressed is also based on a further period of time for which the type of terminal device specific data are not scheduled for transmission to a terminal device such that the suppressed transmission of the selected at least one reference symbol indicates to the terminal device multiple periods of time for which the type of terminal device specific data are not scheduled for transmission to the terminal device.

In accordance with some embodiments the multiple periods of time follow a pattern defined according to the at least one reference symbol selected for suppressed transmission.

In accordance with some embodiments the at least one reference symbol for which transmission is to be suppressed is also selected based on an identity for the terminal device for which the type of terminal device specific data are not scheduled for transmission during the determined period of time.

In accordance with some embodiments the identity for the terminal device uniquely identifies the terminal device.

In accordance with some embodiments the identity for the terminal device identifies a group of terminal devices of which the terminal device is a member.

In accordance with some embodiments an association between the terminal device and the group of terminal devices of which the terminal device is a member is established by signalling between the base station and the terminal device.

In accordance with some embodiments an association between the terminal device and the group of terminal devices of which the terminal device is a member is pre-defined for the wireless telecommunications system.

In accordance with some embodiments suppressing transmission of the at least one reference symbol comprises not transmitting the at least one reference symbol or transmitting the at least one reference symbol with less power than for reference symbols which are not suppressed.

In accordance with some embodiments the radio interface has a downlink radio frame structure comprising radio subframes.

In accordance with some embodiments a reference symbol transmitted in a subframe in which transmission of the at least one reference symbol is suppressed is transmitted with a power greater than it would otherwise be transmitted if the at least one reference symbol had not been suppressed.

In accordance with some embodiments the period of time corresponds with a number of subframes starting at an offset defined relative to a subframe in which a reference symbol is suppressed.

In accordance with some embodiments the at least one reference symbol for which transmission is to be suppressed comprises at least one reference symbol in each one of more than one subframe.

In accordance with some embodiments the radio interface comprises a plurality of Orthogonal Frequency Division Multiplexing, OFDM, sub-carriers spanning a system frequency bandwidth, and wherein the radio interface supports a first carrier for communicating with a first class of terminal device using a first group of the OFDM sub-carriers distributed across the system frequency bandwidth, and a second carrier for communicating with a second class of terminal device on a second group of the OFDM sub-carriers distributed across a restricted frequency bandwidth, wherein the restricted frequency bandwidth is narrower than and within the system frequency bandwidth, and the terminal device is a terminal device of the second class operating on the second carrier.

In accordance with some embodiments the selection of the at least one reference symbol for which transmission is to be suppressed is also based on further information to be conveyed from the base station to the terminal device.

In accordance with some embodiments the method further comprises the base station transmitting terminal device specific data to the terminal device during the period of time for which no terminal device specific data was scheduled for transmission to the terminal device in response to signalling received from the terminal device during this period.

In accordance with some embodiments the method further comprises the base station receiving a channel quality indicator, CQI, from the terminal device on expiry of the period of time for which no terminal device specific data was transmitted to the terminal device.

In accordance with some embodiments the terminal device is a machine-type communication, MTC, terminal device.

In accordance with a second aspect of the invention there is provided a base station configured to convey to a terminal device information regarding a period of time for which a type of terminal device specific data is not scheduled for transmission to the terminal device in a wireless telecommunications system employing a radio interface including an arrangement of downlink reference symbols, the base station comprising: a scheduling unit configured to determine a period of time for which the type of terminal device specific data are not scheduled for transmission to the terminal device; a selecting unit configure to select at least one reference symbol from the arrangement of downlink reference symbols in dependence on the determined period of time; and a transmitter unit configured to suppress transmission of the at least one reference symbol to indicate to the terminal device the period of time for which the type of terminal device specific data are not scheduled for transmission to the terminal device.

In accordance with some embodiments the base station is configured such that the selection of the at least one reference symbol for which transmission is to be suppressed is also based on an association between different ones of the reference symbols and different potential periods of time for which the type of terminal device specific data are not scheduled for transmission to a terminal device.

In accordance with some embodiments the association between different ones of the reference symbols and different potential periods of time for which the type of terminal device specific data are not scheduled for transmission to a terminal device is pre-defined for the wireless telecommunications system.

In accordance with some embodiments the base station is configured such that the association between different ones of the reference symbols and different potential periods of time for which the type of terminal device specific data are not scheduled for transmission to a terminal device is established by the base station and communicated to the terminal device before suppression of the at least one reference symbol.

In accordance with some embodiments the association between different ones of the reference symbols and different potential periods of time for which the type of terminal device specific data are not scheduled for transmission to a terminal device is defined in a look-up table.

In accordance with some embodiments the at least one reference symbol for which transmission is to be suppressed comprises more than one reference symbol selected according to a mapping between different combinations of reference symbols and a plurality of potential periods of time for which the type of terminal device specific data are not scheduled for transmission to a terminal device.

In accordance with some embodiments the base station comprises multiple antenna ports for transmitting the reference symbols and is configured such that the antenna ports for which transmission of the reference symbols is to be suppressed is selected in dependence on the determined period of time for which the type of terminal device specific data are not scheduled for transmission to a terminal device and/or an identity for the terminal device.

In accordance with some embodiments the reference symbols comprise cell-specific reference symbols and/or terminal device specific reference symbols and/or demodulation reference symbols and/or channel state information reference symbols and/or positioning reference symbols.

In accordance with some embodiments the base station is configured such that the selection of the at least one reference symbol for which transmission is to be suppressed is also based on a start time for the period of time for which the type of terminal device specific data are not scheduled for transmission to the terminal device relative to a time at which the transmission of the at least one reference symbol is to be suppressed.

In accordance with some embodiments the base station is configured such that the selection of the at least one reference symbol for which transmission is to be suppressed is also based on a further period of time for which the type of terminal device specific data are not scheduled for transmission to a terminal device such that the suppressed transmission of the selected at least one reference symbol indicates to the terminal device multiple periods of time for which the type of terminal device specific data are not scheduled for transmission to the terminal device.

In accordance with some embodiments the base station is configured such that the multiple periods of time follow a pattern defined according to the at least one reference symbol selected for suppressed transmission.

In accordance with some embodiments the base station is configured such that the at least one reference symbol for which transmission is to be suppressed is also selected based on an identity for the terminal device for which the type of terminal device specific data are not scheduled for transmission during the determined period of time.

In accordance with some embodiments the identity for the terminal device uniquely identifies the terminal device.

In accordance with some embodiments the identity for the terminal device identifies a group of terminal devices of which the terminal device is a member.

In accordance with some embodiments the base station is configured such that an association between the terminal device and the group of terminal devices of which the terminal device is a member is established by signalling between the base station and the terminal device.

In accordance with some embodiments an association between the terminal device and the group of terminal devices of which the terminal device is a member is pre-defined for the wireless telecommunications system.

In accordance with some embodiments the base station is configured such that suppressing transmission of the at least one reference symbol comprises not transmitting the at least one reference symbol or transmitting the at least one reference symbol with less power than another reference symbol for which transmission is not suppressed.

In accordance with some embodiments the radio interface has a downlink radio frame structure comprising radio subframes.

In accordance with some embodiments the base station is configured such that a reference symbol transmitted in a subframe in which transmission of the at least one reference symbol is suppressed is transmitted with a power greater than it would otherwise be transmitted if the at least one reference symbol had not been suppressed.

In accordance with some embodiments the base station is configured such that the period of time corresponds with a number of subframes starting at an offset defined relative to a subframe in which a reference symbol is suppressed.

In accordance with some embodiments the at least one reference symbol for which transmission is to be suppressed comprises at least one reference symbol in each one of more than one subframe.

In accordance with some embodiments the radio interface comprises a plurality of Orthogonal Frequency Division Multiplexing, OFDM, sub-carriers spanning a system frequency bandwidth, and wherein the base station is configured such that the radio interface supports a first carrier for communicating with a first class of terminal device using a first group of the OFDM sub-carriers distributed across the system frequency bandwidth, and a second carrier for communicating with a second class of terminal device on a second group of the OFDM sub-carriers distributed across a restricted frequency bandwidth, wherein the restricted frequency bandwidth is narrower than and within the system frequency bandwidth, and the terminal device is a terminal device of the second class operating on the second carrier.

In accordance with some embodiments the base station is configured such that selection of the at least one reference symbol for which transmission is to be suppressed is also based on further information to be conveyed from the base station to the terminal device.

In accordance with some embodiments the base station is configured to transmit terminal device specific data to the terminal device during the period of time for which no terminal device specific data was scheduled for transmission to the terminal device in response to signalling received from the terminal device during this period.

In accordance with some embodiments the base station is configured to receive a channel quality indicator, CQI, from the terminal device on expiry of the period of time for which no terminal device specific data was transmitted to the terminal device.

According to a third aspect of the invention there is provided a wireless telecommunications system comprising the base station of the second aspect of the invention and the terminal device for which the type of terminal device specific data are not scheduled for transmission during the period of time.

According to a fourth aspect of the invention there is provided a method of operating a terminal device in a wireless telecommunications system employing a radio interface including an arrangement of downlink reference symbols, the method comprising: monitoring reference symbols transmitted by a base station; identifying that transmission by the base station of at least one reference symbol from the arrangement of downlink reference symbols is suppressed; determining a period of time for which to enter a reduced activity mode based on the identified at least one reference symbol for which transmission is suppressed; and initiating the reduced activity mode for the determined period of time.

In accordance with some embodiments the determined period of time for which to enter the reduced activity mode is based on an association between different ones of the reference symbols and different potential periods of time for entering the reduced activity mode.

In accordance with some embodiments the association between different ones of the reference symbols and different potential periods of time for entering the reduced activity mode is pre-defined for the wireless telecommunications system.

In accordance with some embodiments the association between different ones of the reference symbols and different potential periods of time for entering the reduced activity mode is communicated to the terminal device from the base station.

In accordance with some embodiments the association between different ones of the reference symbols and different potential periods of time for entering the reduced activity mode is defined in a look-up table.

In accordance with some embodiments the at least one reference symbol for which transmission is suppressed comprises more than one reference symbol and the period of time for entering the reduced activity mode is determined according to a mapping between different combinations of reference symbols and a plurality of potential periods of time for entering the reduced activity mode.

In accordance with some embodiments the reference symbols are received on transmissions from multiple antenna ports of the base station and the determined period of time for entering the reduced activity mode is based on which antenna port is associated with the at least one reference symbol for which transmission is suppressed.

In accordance with some embodiments the reference symbols comprise cell-specific reference symbols and/or terminal device specific reference symbols and/or demodulation reference symbols and/or channel state information reference symbols and/or positioning reference symbols.

In accordance with some embodiments a start time for the period of time for entering the reduced activity mode relative to a time at which the transmission of the at least one reference symbol is suppressed is also based on the at least one reference symbol for which transmission is suppressed.

In accordance with some embodiments the method further comprises determining at least one further period of time for which to enter a reduced activity mode based on the identified at least one reference symbol for which transmission is suppressed.

In accordance with some embodiments the determined period of time and at least one further period of time follow a pattern defined according to the at least one reference symbol for which transmission is suppressed.

In accordance with some embodiments the method further comprises determining to enter the reduced activity mode for a period of time based on a correspondence between an identifier for the terminal device and an identity associated with the at least one reference symbol for which transmission is suppressed.

In accordance with some embodiments the identity associated with the at least one reference symbol for which transmission is suppressed uniquely identifies the terminal device.

In accordance with some embodiments the identity associated with the at least one reference symbol for which transmission is suppressed identifies a group of terminal devices of which the terminal device is a member.

In accordance with some embodiments an association between the terminal device and the group of terminal devices of which the terminal device is a member is established by signalling between the base station and the terminal device.

In accordance with some embodiments an association between the terminal device and the group of terminal devices of which the terminal device is a member is pre-defined for the wireless telecommunications system.

In accordance with some embodiments the at least one reference symbol is identified as being suppressed based on it not being received or being received with less power than other reference symbols.

In accordance with some embodiments the radio interface has a downlink radio frame structure comprising radio subframes.

In accordance with some embodiments the period of time corresponds with a number of subframes starting at an offset defined relative to a subframe in which a reference symbol is suppressed.

In accordance with some embodiments the at least one reference symbol for which transmission is suppressed comprises at least one reference symbol in each one of more than one subframe.

In accordance with some embodiments the radio interface comprises a plurality of Orthogonal Frequency Division Multiplexing, OFDM, sub-carriers spanning a system frequency bandwidth, and wherein the radio interface supports a first carrier for communicating with a first class of terminal device using a first group of the OFDM sub-carriers distributed across the system frequency bandwidth, and a second carrier for communicating with a second class of terminal device on a second group of the OFDM sub-carriers distributed across a restricted frequency bandwidth, wherein the restricted frequency bandwidth is narrower than and within the system frequency bandwidth, and the terminal device is a terminal device of the second class operating on the second carrier.

In accordance with some embodiments the method further comprises deriving further information communicated from the base station to the terminal device based on the at least one reference symbol for which transmission is suppressed.

In accordance with some embodiments the method further comprises the terminal device transmitting signalling to the base station during the reduced activity mode to request resources for subsequent communications between the base station and the terminal device.

In accordance with some embodiments the method further comprises the terminal device transmitting a channel quality indicator, CQI, to the base station on exit from the reduced activity mode.

In accordance with some embodiments the reduced activity mode is a mode in which the terminal device is configured to decode fewer transmissions from the base station than when the terminal device is not in the reduced activity mode.

In accordance with some embodiments the terminal device continues to decode at least one of synchronisation information and/or system information and/or reference symbols when in the reduced activity mode.

In accordance with some embodiments the terminal device is a machine-type communication, MTC, terminal device.

In accordance with a fifth aspect of the invention there is provided a terminal device for use in a wireless telecommunications system employing a radio interface including an arrangement of downlink reference symbols, the terminal device comprising: a monitoring unit for monitoring reference symbols transmitted by a base station; an identifying unit for identifying that transmission by the base station at least one reference symbol from the arrangement of downlink reference symbols is suppressed; a determining unit for determining a period of time for which to enter a reduced activity mode based on the identified at least one reference symbol for which transmission is suppressed; and an initiating unit for initiating the reduced activity mode for the determined period of time.

In accordance with some embodiments the terminal device is configured such that the determined period of time for which to enter the reduced activity mode is based on an association between different ones of the reference symbols and different potential periods of time for entering the reduced activity mode.

In accordance with some embodiments the association between different ones of the reference symbols and different potential periods of time for entering the reduced activity mode is pre-defined for the wireless telecommunications system.

In accordance with some embodiments the association between different ones of the reference symbols and different potential periods of time for entering the reduced activity mode is communicated to the terminal device from the base station.

In accordance with some embodiments the association between different ones of the reference symbols and different potential periods of time for entering the reduced activity mode is defined in a look-up table.

In accordance with some embodiments the at least one reference symbol for which transmission is suppressed comprises more than one reference symbol and wherein the terminal device is configured such that the period of time for entering the reduced activity mode is determined according to a mapping between different combinations of reference symbols and a plurality of potential periods of time for entering the reduced activity mode.

In accordance with some embodiments the terminal device is configured to receive the reference symbols on transmissions from multiple antenna ports of the base station and to determine the period of time for entering the reduced activity mode based on which antenna port is associated with the at least one reference symbol for which transmission is suppressed.

In accordance with some embodiments the reference symbols comprise cell-specific reference symbols and/or terminal device specific reference symbols and/or demodulation reference symbols and/or channel state information reference symbols and/or positioning reference symbols.

In accordance with some embodiments the terminal device is configured such that a start time for a period of time for entering the reduced activity mode relative to a time at which the transmission of the at least one reference symbol is suppressed is also determined based on the at least one reference symbol for which transmission is suppressed.

In accordance with some embodiments the terminal device is configured to determine at least one further period of time for which to enter a reduced activity mode based on an identified at least one reference symbol for which transmission is suppressed.

In accordance with some embodiments the determined period of time and at least one further period of time follow a pattern defined according to the at least one reference symbol for which transmission is suppressed.

In accordance with some embodiments the terminal device is configured to determine to enter the reduced activity mode for a period of time based on a correspondence between an identifier for the terminal device and an identity associated with the at least one reference symbol for which transmission is suppressed.

In accordance with some embodiments the identity associated with the at least one reference symbol for which transmission is suppressed uniquely identifies the terminal device.

In accordance with some embodiments the identity associated with the at least one reference symbol for which transmission is suppressed identifies a group of terminal devices of which the terminal device is a member.

In accordance with some embodiments the terminal device is configured such that an association between the terminal device and the group of terminal devices of which the terminal device is a member is established by signalling between the base station and the terminal device.

In accordance with some embodiments an association between the terminal device and the group of terminal devices of which the terminal device is a member is predefined for the wireless telecommunications system.

In accordance with some embodiments the terminal device is configured such that the at least one reference symbol is identified as being suppressed based on it not being received or being received with less power than other reference symbols.

In accordance with some embodiments the radio interface has a downlink radio frame structure comprising radio subframes.

In accordance with some embodiments the period of time corresponds with a number of subframes starting at an offset defined relative to a subframe in which a reference symbol is suppressed.

In accordance with some embodiments the at least one reference symbol for which transmission is suppressed comprises at least one reference symbol in each one of more than one subframe.

In accordance with some embodiments the radio interface comprises a plurality of Orthogonal Frequency Division Multiplexing, OFDM, sub-carriers spanning a system frequency bandwidth, and wherein the radio interface supports a first carrier for communicating with a first class of terminal device using a first group of the OFDM sub-carriers distributed across the system frequency bandwidth, and a second carrier for communicating with a second class of terminal device on a second group of the OFDM sub-carriers distributed across a restricted frequency bandwidth, wherein the restricted frequency bandwidth is narrower than and within the system frequency bandwidth, and the terminal device is a terminal device of the second class operating on the second carrier.

In accordance with some embodiments the terminal device is configured to derive further information communicated by the base station based on the at least one reference symbol for which transmission is suppressed.

In accordance with some embodiments the terminal device is configured to transmit signalling to the base station during the reduced activity mode to request resources for subsequent communications between the base station and the terminal device.

In accordance with some embodiments the terminal device is configured to transmit a channel quality indicator, CQI, to the base station on exit from the reduced activity mode.

In accordance with some embodiments the reduced activity mode is a mode in which the terminal device is configured to decode fewer transmissions from the base station than when the terminal device is not in the reduced activity mode.

In accordance with some embodiments the terminal device is configured to continue to decode at least one of synchronisation information and/or system information and/or reference symbols when in the reduced activity mode.

In accordance with some embodiments the terminal device is a machine-type communication, MTC, terminal device.

According to a sixth aspect of the invention there is provided a wireless telecommunications system comprising the terminal device of the fifth aspect of the invention and a base station.

It will be appreciated that features and aspects of the invention described above in relation to the first and other aspects of the invention are equally applicable and may be combined with embodiments of the invention according to the different aspects of the invention as appropriate, and not just in the specific combinations described above.

BRIEF DESCRIPTION OF DRAWINGS

Embodiments of the present invention will now be described by way of example only with reference to the accompanying drawings where like parts are provided with corresponding reference numerals and in which.

DESCRIPTION OF EXAMPLE EMBODIMENTS

Embodiments of the invention may in particular be employed within the context of what might be termed "virtual carriers" operating within a bandwidth of a "host carriers". The concepts of virtual carriers are described in co-pending UK patent applications numbered GB 1101970.0 [2], GB 1101981.7 [3], GB 1101966.8 [4], GB 1101983.3 [5], GB 1101853.8 [6], GB 1101982.5 [7], GB 1101980.9 [8], GB 1101972.6 [9], GB 1121767.6 [10] and GB 1121766.8 [11] the contents of which are incorporated herein by reference. The reader is referred to these co-pending applications for more details, but for ease of reference an overview of the concept of virtual carriers is also provided here.

Conventional Network

Figure 1:
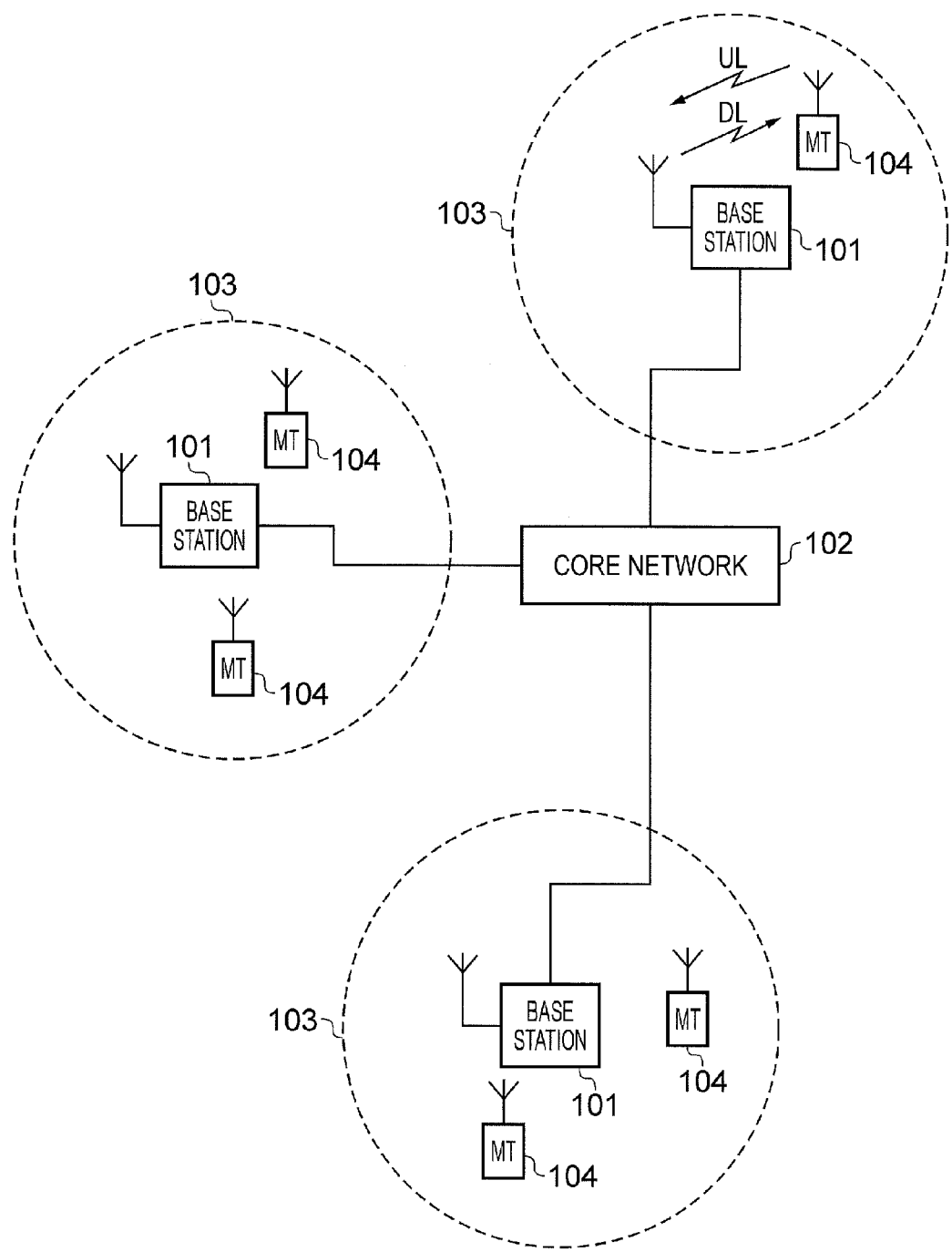
FIG. 1 provides a schematic diagram illustrating an example of a conventional mobile telecommunication network.

FIG. 1 provides a schematic diagram illustrating some basic functionality of a conventional mobile telecommunications network.

The network includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on.

Figure 2:
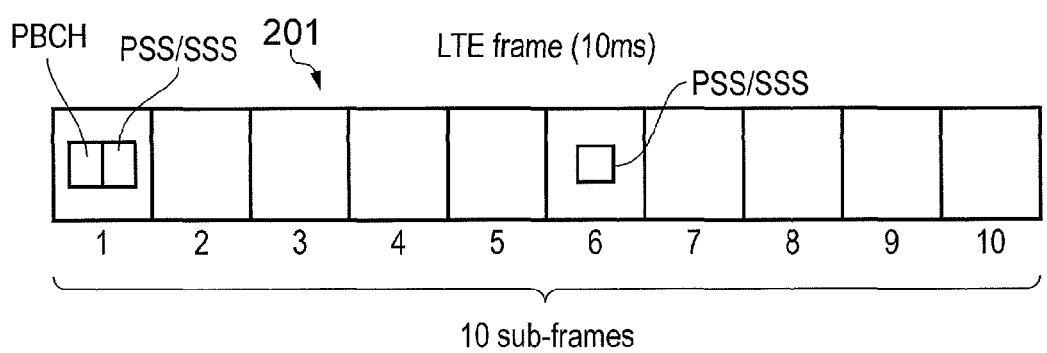
FIG. 2 provides a schematic diagram illustrating a conventional LTE radio frame.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA). FIG. 2 shows a schematic diagram illustrating an OFDM based LTE downlink radio frame 201. The LTE downlink radio frame is transmitted from an LTE base station (known as an enhanced Node B) and lasts 10 ms. The downlink radio frame comprises ten subframes, each subframe lasting 1 ms. A primary synchronisation signal (PSS) and a secondary synchronisation signal (SSS) are transmitted in the first and sixth subframes of the LTE frame. A primary broadcast channel (PBCH) is transmitted in the first subframe of the LTE frame. The PSS, SSS and PBCH are discussed in more detail below.

Figure 3:
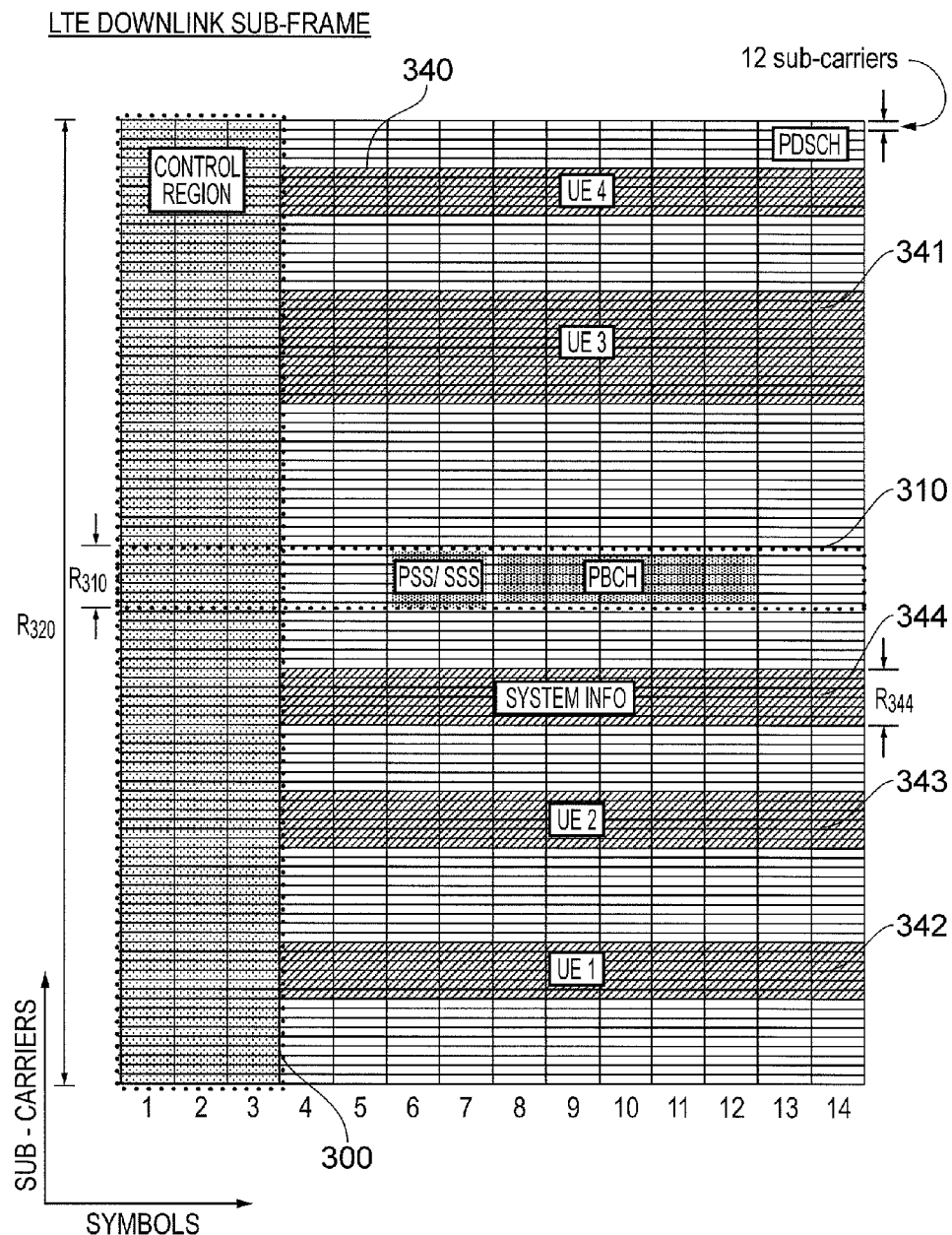
FIG. 3 provides a schematic diagram illustrating an example of a conventional LTE downlink radio subframe.

FIG. 3 is a schematic diagram of a grid which illustrates the structure of an example conventional downlink LTE subframe. The subframe comprises a predetermined number of symbols which are transmitted over a 1 ms period. Each symbol comprises a predetermined number of orthogonal sub-carriers distributed across the bandwidth of the downlink radio carrier.

The example subframe shown in FIG. 3 comprises 14 symbols and 1200 sub-carriers spread across a 20 MHz bandwidth. The smallest allocation of user data for transmission in LTE is a resource block comprising twelve sub-carriers transmitted over one slot (0.5 subframe). For clarity, in FIG. 3, each individual resource element is not shown, instead each individual box in the subframe grid corresponds to twelve sub-carriers transmitted on one symbol.

FIG. 3 shows in hatching resource allocations for four LTE terminals 340, 341, 342, 343. For example, the resource allocation 342 for a first LTE terminal (UE 1) extends over five blocks of twelve sub-carriers (i.e. 60 sub-carriers), the resource allocation 343 for a second LTE terminal (UE2) extends over six blocks of twelve sub-carriers and so on.

Control channel data is transmitted in a control region 300 (indicated by dotted-shading in FIG. 3) of the subframe comprising the first n symbols of the subframe where n can vary between one and three symbols for channel bandwidths of 3 MHz or greater and where n can vary between two and four symbols for channel bandwidths of 1.4 MHz. For the sake of providing a concrete example, the following description relates to host carriers with a channel bandwidth of 3 MHz or greater so the maximum value of n will be 3. The data transmitted in the control region 300 includes data transmitted on the physical downlink control channel (PDCCH), the physical control format indicator channel (PCFICH) and the physical HARQ indicator channel (PHICH).

PDCCH contains control data indicating which sub-carriers on which symbols of the subframe have been allocated to specific LTE terminals. Thus, the PDCCH data transmitted in the control region 300 of the subframe shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (i.e. between one and three symbols).

PHICH contains HARQ (Hybrid Automatic Request) data indicating whether or not previously transmitted uplink data has been successfully received by the network.

Symbols in a central band 310 of the time-frequency resource grid are used for the transmission of information including the primary synchronisation signal (PSS), the secondary synchronisation signal (SSS) and the physical broadcast channel (PBCH). This central band 310 is typically 72 sub-carriers wide (corresponding to a transmission bandwidth of 1.08 MHz). The PSS and SSS are synchronisation signals that once detected allow an LTE terminal device to achieve frame synchronisation and determine the cell identity of the enhanced Node B transmitting the downlink signal. The PBCH carries information about the cell, comprising a master information block (MIB) that includes parameters that LTE terminals use to properly access the cell. Data transmitted to individual LTE terminals on the physical downlink shared channel (PDSCH) can be transmitted in other resource elements of the subframe. Further explanation of these channels is provided below.

FIG. 3 also shows a region of PDSCH containing system information and extending over a bandwidth of $R_{344}$. A conventional LTE frame will also include reference signals which are discussed further below but not shown in FIG. 3 in the interests of clarity.

The number of sub-carriers in an LTE channel can vary depending on the configuration of the transmission network. Typically this variation is from 72 sub carriers contained within a 1.4 MHz channel bandwidth to 1200 sub-carriers contained within a 20 MHz channel bandwidth (as schematically shown in FIG. 3). As is known in the art, data transmitted on the PDCCH, PCFICH and PHICH is typically distributed on the sub-carriers across the entire bandwidth of the subframe to provide for frequency diversity. Therefore a conventional LTE terminal must be able to receive the entire channel bandwidth in order to receive and decode the control region.

Figure 4:
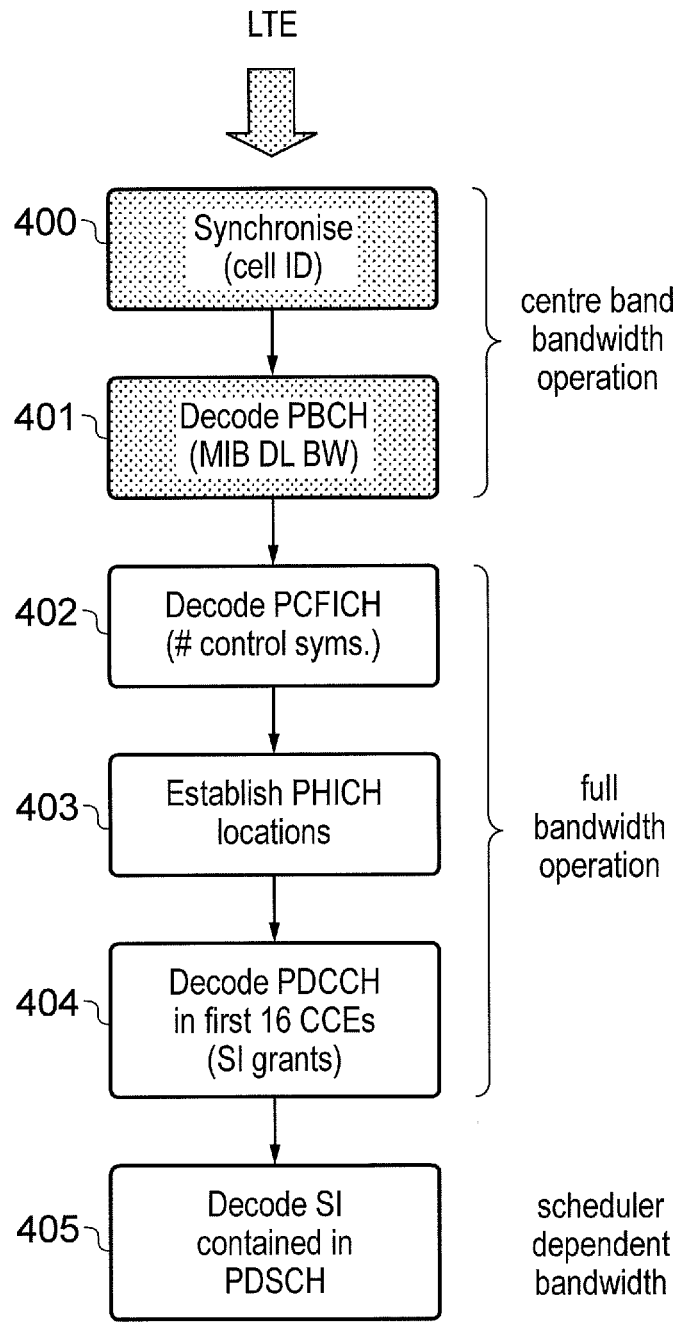
FIG. 4 provides a schematic diagram illustrating a conventional LTE "camp-on" procedure.

FIG. 4 illustrates an LTE "camp-on" process, that is, the process followed by a terminal so that it can decode downlink transmissions which are sent by a base station via a downlink channel. Using this process, the terminal can identify the parts of the transmissions that include system information for the cell and thus decode configuration information for the cell.

As can be seen in FIG. 4, in a conventional LTE camp-on procedure, the terminal first synchronizes with the base station (step 400) using the PSS and SSS in the centre band and then decodes the PBCH (step 401). Once the terminal has performed steps 400 and 401, it is synchronized with the base station.

For each subframe, the terminal then decodes the PCFICH which is distributed across the entire bandwidth of carrier 320 (step 402). As discussed above, an LTE downlink carrier can be up to 20 MHz wide (1200 sub-carriers) and an LTE terminal therefore has to have the capability to receive and decode transmissions on a 20 MHz bandwidth in order to decode the PCFICH. At the PCFICH decoding stage, with a 20 MHz carrier band, the terminal operates at a much larger bandwidth (bandwidth of $R_{320}$) than during steps 400 and 401 (bandwidth of $R_{310}$) relating to synchronization and PBCH decoding.

The terminal then ascertains the PHICH locations (step 403) and decodes the PDCCH (step 404), in particular for identifying system information transmissions and for identifying its resource allocations. The resource allocations are used by the terminal to locate system information and to locate its data in the PDSCH as well as to be informed of any transmission resources it has been granted on PUSCH. Both system information and UE-specific resource allocations are transmitted on PDSCH and scheduled within the carrier band 320. Steps 403 and 404 also require the terminal to operate on the entire bandwidth R320 of the carrier band.

At steps 402 to 404, the terminal decodes information contained in the control region 300 of a subframe. As explained above, in LTE, the three control channels mentioned above (PCFICH, PHICH and PDCCH) can be found across the control region 300 of the carrier where the control region extends over the range $R_{320}$ and occupies the first one, two or three OFDM symbols of each subframe as discussed above. In a subframe, typically the control channels do not use all the resource elements within the control region 300, but they are scattered across the entire region, such that a LTE terminal has to be able to simultaneously receive the entire control region 300 for decoding each of the three control channels.

The terminal can then decode the PDSCH (step 405) which contains system information or data transmitted for this terminal.

As explained above, in an LTE subframe the PDSCH generally occupies groups of resource elements which are neither in the control region nor in the resource elements occupied by PSS, SSS or PBCH. The data in the blocks of resource elements 340, 341, 342, 343 allocated to the different mobile communication terminals (UEs) shown in FIG. 3 have a smaller bandwidth than the bandwidth of the entire carrier, although to decode these blocks a terminal first receives the PDCCH spread across the frequency range $R_{320}$ to determine if the PDCCH indicates that a PDSCH resource is allocated to the UE and should be decoded. Once a UE has received the entire subframe, it can then decode the PDSCH in the relevant frequency range (if any) indicated by the PDCCH. So for example, UE 1 discussed above decodes the whole control region 300 and then the data in the resource block 342.

Virtual Downlink Carrier

Certain classes of devices, such as MTC devices (e.g. semi-autonomous or autonomous wireless communication devices such as smart meters as discussed above), support communication applications that are characterised by the transmission of small amounts of data at relatively infrequent intervals and can thus be considerably less complex than conventional LTE terminals. In many scenarios, providing low capability terminals such as those with a conventional high-performance LTE receiver unit capable of receiving and processing data from an LTE downlink frame across the full carrier bandwidth can be overly complex for a device which only needs to communicate small amounts of data. This may therefore limit the practicality of a widespread deployment of low capability MTC type devices in an LTE network. It is preferable instead to provide low capability terminals such as MTC devices with a simpler receiver unit which is more proportionate with the amount of data likely to be transmitted to the terminal. As set out below, in accordance with examples of the present invention a "virtual carrier" is provided within the transmission resources of a conventional OFDM type downlink carrier (i.e. a "host carrier"). Unlike data transmitted on a conventional OFDM type downlink carrier, data transmitted on the virtual carrier can be received and decoded without needing to process the full bandwidth of the downlink host OFDM carrier. Accordingly, data transmitted on the virtual carrier can be received and decoded using a reduced complexity receiver unit.

Figure 5:
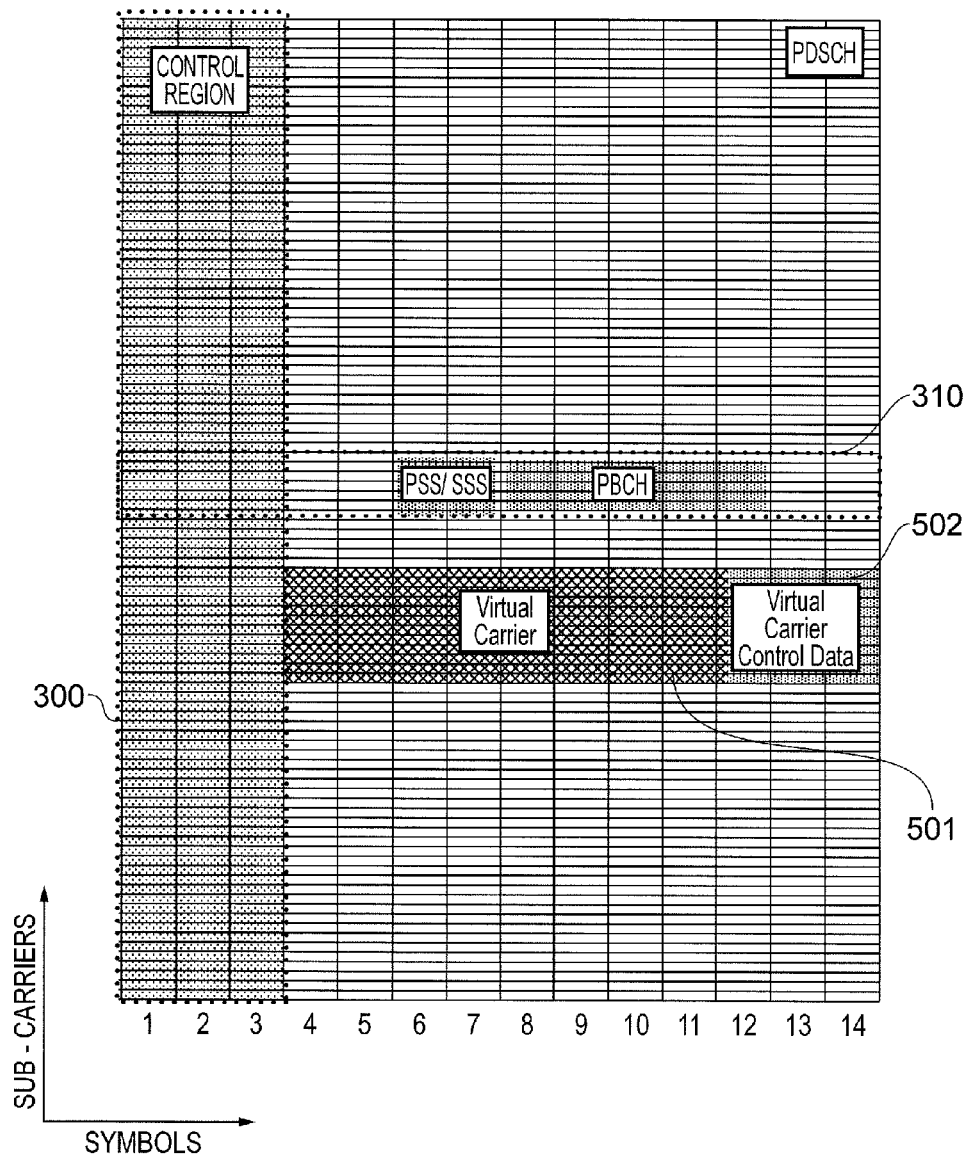
FIG. 5 provides a schematic diagram illustrating an LTE downlink radio subframe in which a virtual carrier has been inserted in accordance with an embodiment of the invention.

FIG. 5 provides a schematic diagram illustrating an LTE downlink subframe which includes a virtual carrier inserted in a host carrier in accordance with an example of the present invention.

In keeping with a conventional LTE downlink subframe, the first n symbols (n is three in FIG. 5) form the control region 300 which is reserved for the transmission of downlink control data such as data transmitted on the PDCCH. However, as can be seen from FIG. 5, outside of the control region 300 the LTE downlink subframe includes a group of resource elements positioned in this example below the central band 310 which form a virtual carrier 501. As explained further below, the virtual carrier 501 is adapted so that data transmitted on the virtual carrier 501 can be treated as logically distinct from data transmitted in the remaining parts of the host carrier and can be decoded without decoding all the control data from the control region 300. Although FIG. 5 shows the virtual carrier occupying frequency resources below the centre band, in general the virtual carrier can occupy other frequency resources, for example, above the centre band or including the centre band. If the virtual carrier is configured to overlap any resources used by the PSS, SSS or PBCH of the host carrier, or any other signal transmitted by the host carrier that a terminal device operating on the host carrier would require for correct operation and expect to find in a known pre-determined location, the signals on the virtual carrier can be arranged such that these aspects of the host carrier signal are maintained.

As can be seen from FIG. 5, data transmitted on the virtual carrier 501 is transmitted across a limited bandwidth. This might be any suitable bandwidth smaller than that of the host carrier. In the example shown in FIG. 5 the virtual carrier is transmitted across a bandwidth comprising 12 blocks of 12 sub-carriers (i.e. 144 sub-carriers), which is equivalent to a 2.16 MHz transmission bandwidth. Accordingly, a terminal using the virtual carrier need only be equipped with a receiver capable of receiving and processing data transmitted over a bandwidth of 2.16 MHz. This enables low capability terminals (for example MTC type terminals) to be provided with simplified receiver units yet still be able to operate within an OFDM type communication network which, as explained above, conventionally requires terminals to be equipped with receivers capable of receiving and processing an OFDM signal across the entire bandwidth of the signal.

As explained above, in OFDM-based mobile communication systems such as LTE, downlink data is dynamically assigned to be transmitted on different sub-carriers on a subframe by subframe basis. Accordingly, in every subframe the network signals which sub-carriers on which symbols contain data relevant to which terminals (i.e. downlink allocation signalling).

As can be seen from FIG. 3, in a conventional downlink LTE subframe this information is transmitted on the PDCCH during the first symbol or symbols of the subframe. However, as previously explained, the information transmitted in the PDCCH is spread across the entire bandwidth of the subframe and therefore cannot be received by a mobile communication terminal with a simplified receiver unit capable only of receiving the reduced bandwidth virtual carrier.

Accordingly, as can be seen in FIG. 5, the final symbols of the virtual carrier can be reserved as a control region 502 for the virtual carrier for the transmission of control data indicating which resource elements of the virtual carrier 501 have been allocated to user equipment (UEs) using the virtual carrier. In some examples the number of symbols comprising the virtual carrier control region 502 might be fixed, for example three symbols. In other examples the virtual carrier control region 502 can vary in size, for example between one and three symbols, as with the control region 300.

The virtual carrier control region can be located at any suitable position, for example in the first few symbols of the virtual carrier. In the example of FIG. 5 this could mean positioning the virtual carrier control region on the fourth, fifth and sixth symbols. However, fixing the position of the virtual carrier control region in the final symbols of the subframe can be useful because the position of the virtual carrier control region will not vary in dependence on the number of symbols of the host carrier control region 300. This can help simplify the processing undertaken by mobile communication terminals receiving data on the virtual carrier because there is no need for terminals to determine a position of the virtual carrier control region every subframe if it is known that it will always be positioned in the final n symbols of the subframe.

In a further embodiment, the virtual carrier control symbols may reference virtual carrier PDSCH transmissions in a separate subframe.

In some examples the virtual carrier may be located within the centre band 310 of the downlink subframe. This can help reduce the impact on host carrier PDSCH resources caused by the introduction of the virtual carrier within the host carrier bandwidth since the resources occupied by the PSS/SSS and PBCH would be contained within the virtual carrier region and not the remaining host carrier PDSCH region. Therefore, depending on for example the expected virtual carrier throughput, the location of a virtual carrier can be appropriately chosen to either exist inside or outside the centre band according to whether the host or virtual carrier is chosen to bear the overhead of the PSS, SSS and PBCH.

Virtual Carrier "Camp-On" Process

As explained above, before a conventional LTE terminal can begin transmitting and receiving data in a cell, it first camps on to the cell. An adapted camp-on process can be provided for terminals using the virtual carrier.

Figure 6:
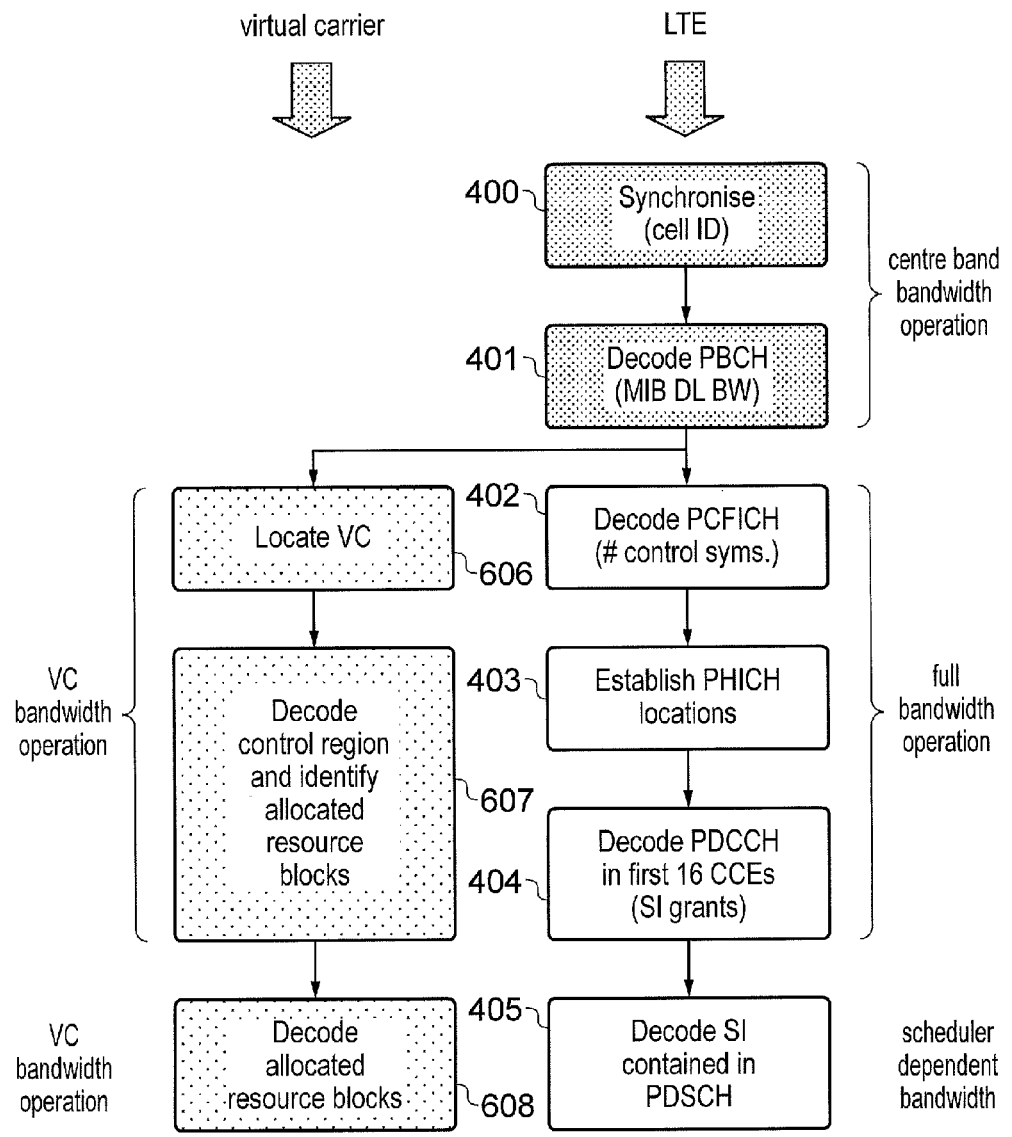
FIG. 6 provides a schematic diagram illustrating an adapted LTE "camp-on" procedure for camping on to a virtual carrier.

FIG. 6 shows a flow diagram schematically illustrating a camp-on process according to an example of the present invention. There are two branches shown in FIG. 6. Different steps of the process associated with a UE intending to use the virtual carrier are shown under the general heading "virtual carrier". The steps shown under the general heading "legacy LTE" are associated with a UE intending to use the host carrier, and these steps correspond to the steps of FIG. 4. In this example, the first two steps 400, 401 of the camp-on procedure are common to both the virtual carrier and host (legacy LTE) carrier.

The virtual carrier camp-on process is explained with reference to the example subframe shown in FIG. 5 in which a virtual carrier with a bandwidth of 144 sub-carriers is inserted within the operating bandwidth of a host carrier with a bandwidth corresponding to 1200 sub-carriers. As discussed above, a terminal having a receiver unit with an operational bandwidth of less than that of the host carrier cannot fully decode data in the control region of subframes of the host carrier. However, a receiver unit of a terminal having an operational bandwidth of only twelve blocks of twelve sub-carriers (i.e. 2.16 MHz) can receive control and user data transmitted on this example virtual carrier 502.

As noted above, in the example of FIG. 6, the first steps 400 and 401 for a virtual carrier terminal are the same as the conventional camp-on process shown in FIG. 4, although a virtual carrier terminal may extract additional information from the MIB as described below. Both types of terminals (i.e. virtual carrier terminals and host/legacy carrier terminals) can use the PSS/SSS and PBCH to synchronize with the base station using the information carried on the 72 sub-carrier centre band within the host carrier. However, where the conventional LTE terminals then continue with the process by performing the PCFICH decoding step 402, which requires a receiver unit capable of receiving and decoding the host carrier control region 300, a terminal camping on to the cell to receive data on the virtual carrier (which may be referred to as a "virtual carrier terminal") performs steps 606 and 607 instead.

In a further example a separate synchronisation and PBCH functionality can be provided for the virtual carrier device as opposed to re-using the same conventional initial camp-on processes of steps 400 and 401 of the host carrier device.

Figure 7:
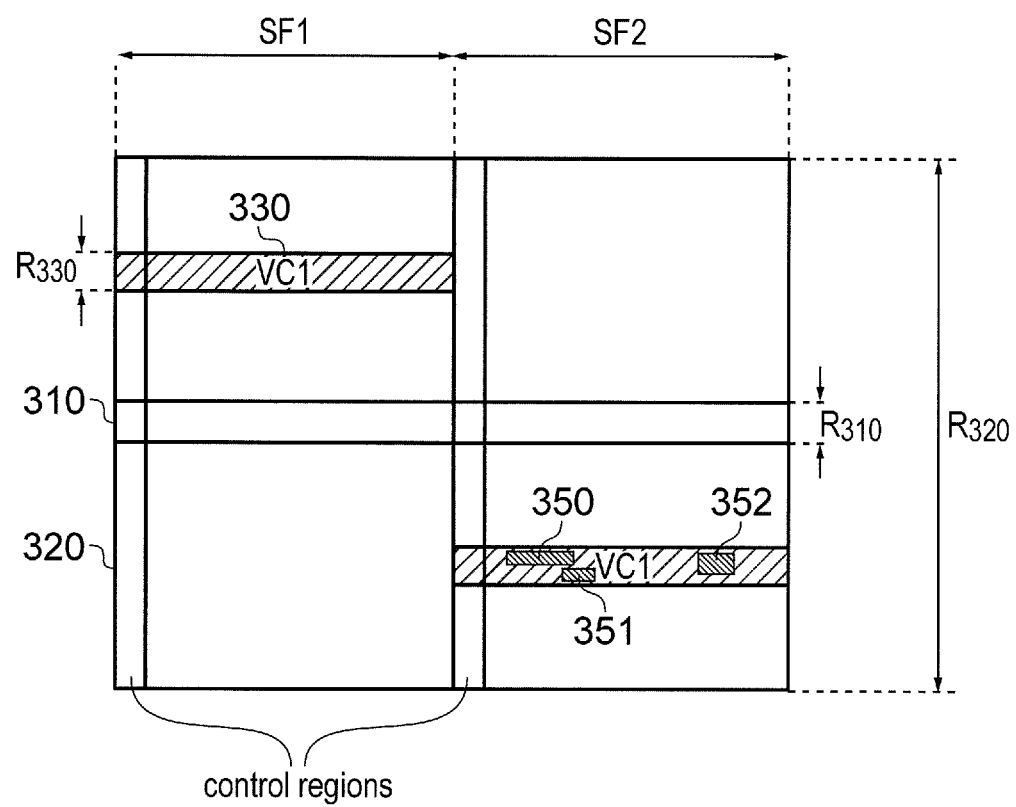
FIG. 7 provides a schematic diagram illustrating LTE downlink radio subframes in accordance with an embodiment of the present invention.

At step 606, the virtual carrier terminal locates a virtual carrier, if any is provided within the host carrier, using a virtual carrier-specific step. Various examples of how this step may be performed are discussed further below. Once the virtual carrier terminal has located a virtual carrier, it can access information within the virtual carrier. For example, if the virtual carrier mirrors the conventional LTE resource allocation method, the virtual carrier terminal may proceed to decode control portions within the virtual carrier, which can, for example, indicate which resource elements within the virtual carrier have been allocated for a specific virtual carrier terminal or for system information. For example, FIG. 7 shows the blocks of resource elements 350 to 352 within virtual carrier 330 that have been allocated for the subframe SF2. However, there is no requirement for the virtual carrier terminal to follow or mirror the conventional LTE process (e.g. steps 402-404) and these steps may for example be implemented very differently for a virtual carrier camp-on process.

Regardless of the virtual carrier terminal following a LTE-like step or a different type of step when performing step 607, the virtual carrier terminal can then decode the allocated resource elements at step 608 and thereby receive data transmitted by the base station broadcasting the virtual carrier. The data decoded in step 608 may include, for example, the remainder of the system information containing details of the network configuration.

Even though the virtual carrier terminal does not have the bandwidth capabilities to decode and receive downlink data if it was transmitted in the host carrier using conventional LTE, it can still access a virtual carrier within the host carrier having a limited bandwidth whilst re-using the initial LTE steps. Step 608 may also be implemented in a LTE-like manner or in a different manner. For example, multiple virtual carrier terminals may share a virtual carrier and have grants allocated to manage the virtual carrier sharing as shown in SF2 in FIG. 7, or, in another example, a virtual carrier terminal may have the entire virtual carrier allocated for its own downlink transmissions, or the virtual carrier may be entirely allocated to a virtual carrier terminal for a certain number of subframe only, etc.

There is thus a large degree of flexibility provided for the virtual carrier camp-on process. There is, for example, the ability to adjust a balance between re-using or mirroring conventional LTE steps or processes, thereby reducing the terminal complexity and the need to implement new elements, and adding new virtual carrier specific aspects or implementations, thereby potentially optimizing the use of narrow-band virtual carriers, as LTE has been designed with the larger-band host carriers in mind.

Downlink Virtual Carrier Detection

As discussed above, the virtual carrier terminal should locate (within the time-frequency resource grid of the host carrier) the virtual carrier before it can receive and decode transmissions on the virtual carrier. Several alternatives are available for the virtual carrier presence and location determination, which can be implemented separately or in combination. Some of these options are discussed below.

To facilitate the virtual carrier detection, the virtual carrier location information may be provided to the virtual carrier terminal such that it can locate the virtual carrier, if any exists, more easily. For example, such location information may comprise an indication that one or more virtual carriers are provided within the host carrier, or that the host carrier does not currently provide any virtual carrier. It may also comprise an indication of the virtual carrier's bandwidth, for example in MHz or blocks of resource elements. Alternatively, or in combination, the virtual carrier location information may comprise the virtual carrier's centre frequency and bandwidth, thereby giving the virtual carrier terminal the location and bandwidth of any active virtual carrier. In the event the virtual carrier is to be found at a different frequency position in each subframe, according, for example, to a pseudo-random hopping algorithm, the location information can, for example, indicate a pseudo random parameter. Such parameters may include a starting frame and parameters used for the pseudo-random algorithm. Using these pseudo-random parameters, the virtual carrier terminal can then know where the virtual carrier can be found for any subframe.

Figure 8:
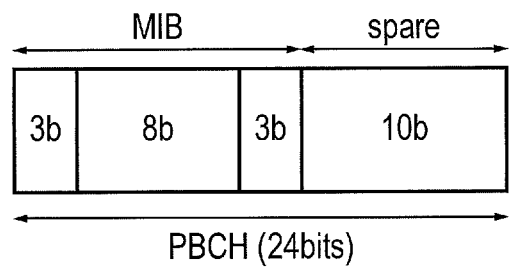
FIG. 8 provides a schematic diagram illustrating a physical broadcast channel (PBCH)
Figure 9:
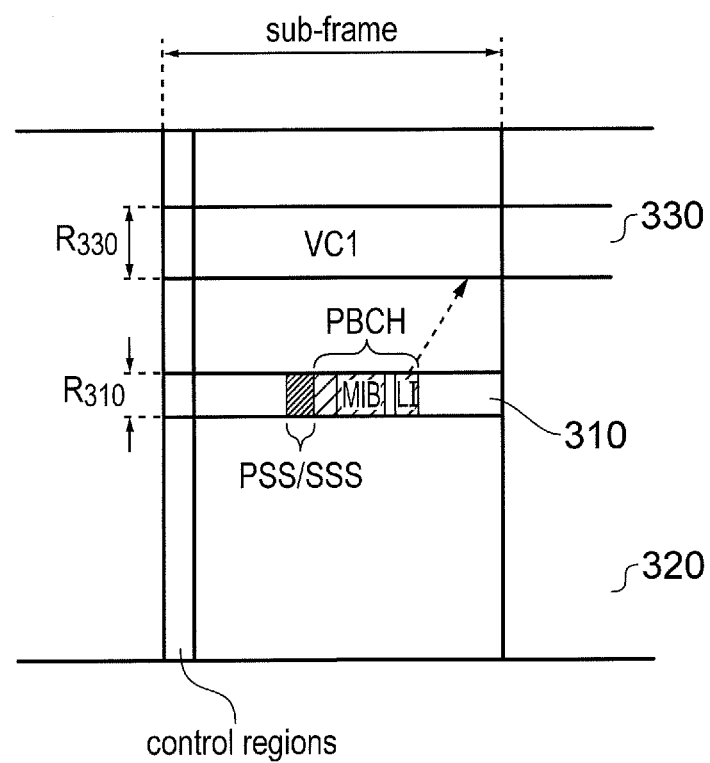
FIG. 9 provides a schematic diagram illustrating an LTE downlink radio subframe in accordance with an embodiment of the present invention.

On implementation feature associated with little change to the virtual carrier terminal (as compared with a conventional LTE terminal) would be to include location information for the virtual carrier within the PBCH, which already carries the Master Information Block, or MIB in the host carrier centre band. As shown in FIG. 8, the MIB consists of 24 bits (3 bits to indicate DL bandwidth, 8 bits to indicate the System Frame Number or SFN, and 3 bits regarding the PHICH configuration). The MIB therefore comprises 10 spare bits that can be used to carry location information in respect of one or more virtual carriers. For example, FIG. 9 shows an example where the PBCH includes the MIB and location information ("LI") for pointing any virtual carrier terminal to a virtual carrier.

Alternatively, virtual carrier location information could be provided in the centre band, outside of the PBCH. It can for example be always provided after and adjacent to the PBCH. By providing the location information in the centre band but outside of the PBCH, the conventional PBCH is not modified for the purpose of using virtual carriers, but a virtual carrier terminal can easily find the location information in order to detect the virtual carrier, if any.

The virtual carrier location information, if provided, can be provided elsewhere in the host carrier, but it may be advantageous to provide it in the centre band, for example because a virtual carrier terminal may configure its receiver to operate on the centre band and the virtual carrier terminal then does not need to adjust its receiver settings for finding the location information.

Depending on the amount of virtual carrier location information provided, the virtual carrier terminal can either adjust its receiver to receive the virtual carrier transmissions, or it may require further location information before it can do so.

If for example, the virtual carrier terminal was provided with location information indicating a virtual carrier presence and/or a virtual carrier bandwidth but not indicating any details as to the exact virtual carrier frequency range, or if the virtual carrier terminal was not provided with any location information, the virtual carrier terminal could then scan the host carrier for a virtual carrier (e.g. performing a so-called blind search process). Scanning the host carrier for a virtual carrier can be based on different approaches, some of which will be presented below.

Figure 10:
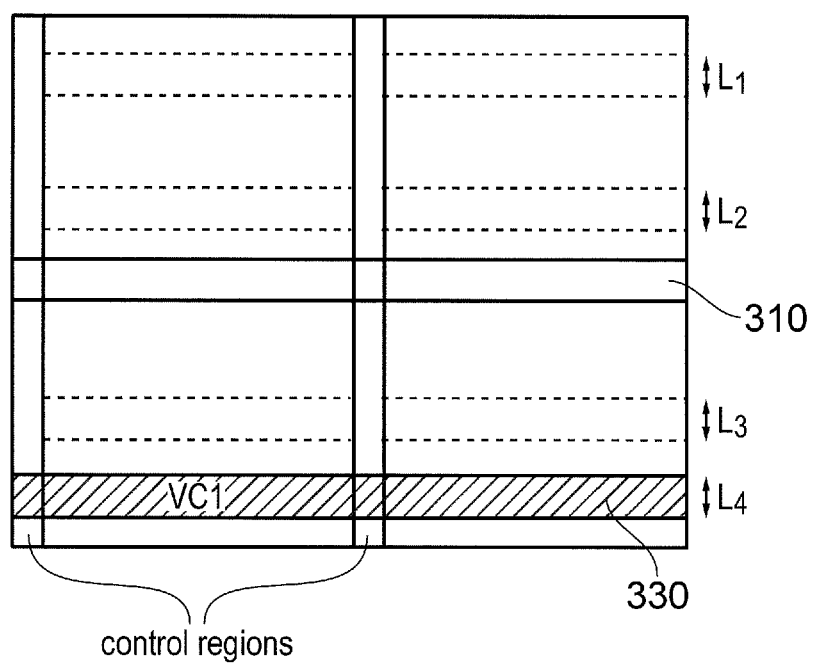
FIG. 10 provides a schematic diagram illustrating an LTE downlink radio subframe in which a virtual carrier has been inserted in accordance with an embodiment of the invention.
Figure 11A:
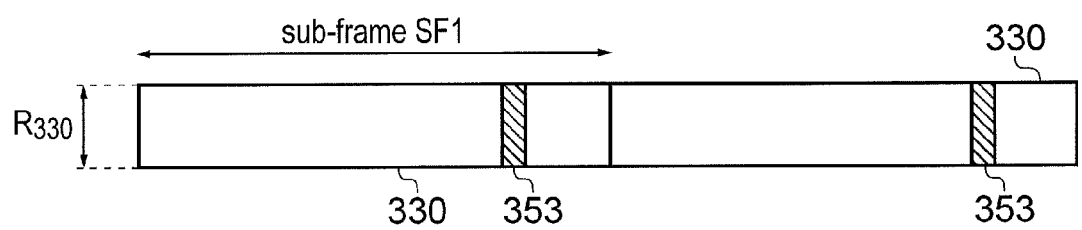
FIGS. 11A to 11D provide schematic diagrams illustrating positioning of location signals within a LTE downlink subframe according to embodiments of the present invention.
Figure 11B:
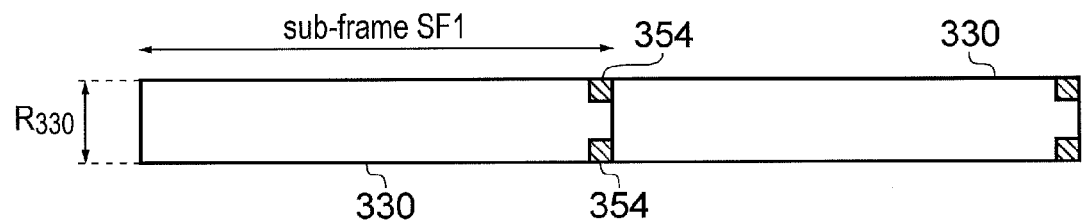
Figure 11C:
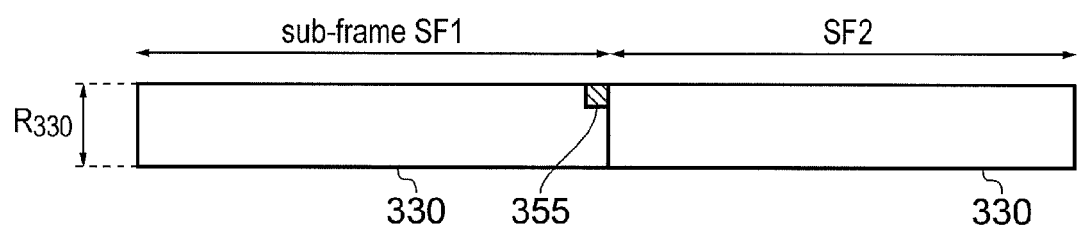

According to a first approach, a virtual carrier might only be inserted in certain pre-determined locations, as illustrated for example in FIG. 10 for a four-location example. The virtual carrier terminal then scans the four locations L1-L4 for any virtual carrier. If and when the virtual carrier terminal detects a virtual carrier, it can then "camp-on" the virtual carrier to receive downlink data as described above. In this approach, the virtual carrier terminal may be provided with the possible virtual carrier locations in advance, for example they may be stored as a network-specific setting in an internal memory. Detection of a virtual carrier could be accomplished by seeking to decode a particular physical channel on the virtual carrier. The successful decoding of such a channel, indicated for example by a successful cyclic redundancy check (CRC) on decoded data, would indicate the successful location of the virtual carrier According to a second approach, the virtual carrier may include location signals such that a virtual carrier terminal scanning the host carrier can detect such signals to identify the presence of a virtual carrier. Examples of possible location signals are illustrated in FIGS. 11A to 11D. In the examples of FIGS. 11A to 11C, the virtual carrier regularly sends an arbitrary location signal such that a terminal scanning a frequency range where the location signal is would detect this signal. An "arbitrary" signal is intended here to include any signal that does not carry any information as such, or is not meant to be interpreted, but merely includes a specific signal or pattern that a virtual carrier terminal can detect. This can for example be a series of positive bits across the entire location signal, an alternation of 0 and 1 across the location signal, or any other suitable arbitrary signal. It is noteworthy that the location signal may be made of adjacent blocks of resource elements or may be formed of non-adjacent blocks. For example, it may be located at every other block of resource elements at the "top" (i.e. upper frequency limit) of the virtual carrier.

In the example of FIG. 11A, the location signal 353 extends across the range $R_{330}$ of the virtual carrier 330 and is always found at the same position in the virtual carrier within a subframe. If the virtual carrier terminal knows where to look for a location signal in a virtual carrier subframe, it can then simplify its scanning process by only scanning this position within a subframe for a location signal. FIG. 11B shows a similar example where every subframe includes a location signal 354 comprising two parts: one at the top corner and one at the bottom corner of the virtual carrier subframe, at the end of this subframe. Such a location signal may be useful if, for example, the virtual carrier terminal does not know the bandwidth of the virtual carrier in advance as it can facilitate a clear detection of the top and bottom frequency edges of the virtual carrier band.

In the example of FIG. 11C, a location signal 355 is provided in a first subframe SF1, but not in a second subframe SF2. The location signal can for example be provided every two subframes. The frequency of the location signals can be chosen to adjust a balance between reducing scanning time and reducing overhead. In other words, the more often the location signal is provided, the less long it takes a terminal to detect a virtual carrier but the more overhead there is.

Figure 11D:
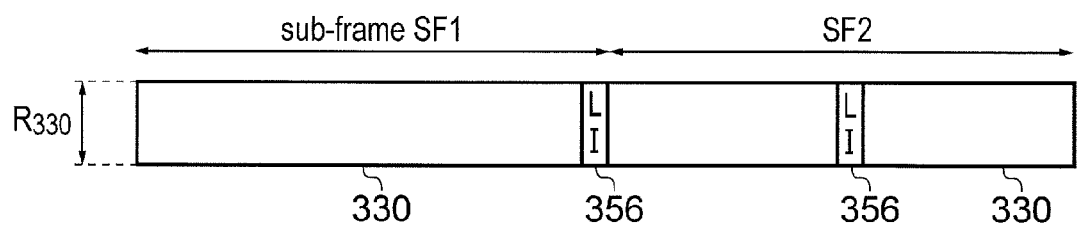

In the example of FIG. 11D, a location signal is provided where this location signal is not an arbitrary signal as in FIGS. 11A to 11C, but is a signal that includes information for virtual carrier terminals. The virtual carrier terminals can detect this signal when they scan for a virtual carrier and the signal may include information in respect of, for example, the virtual carrier bandwidth or any other virtual carrier-related information (location or non-location information). When detecting this signal, the virtual carrier terminal can thereby detect the presence and location of the virtual carrier. As shown in FIG. 11D, the location signal can, like an arbitrary location signal, be found at different locations within the subframe, and the location may vary on a per-subframe basis.

Dynamic Variation of Control Region Size of Host Carrier

As explained above, in LTE the number of symbols that make up the control region of a downlink subframe varies dynamically depending on the quantity of control data that needs to be transmitted. Typically, this variation is between one and three symbols. As will be understood with reference to FIG. 5, variation in the width of the host carrier control region will cause a corresponding variance in the number of symbols available for the virtual carrier. For example, as can be seen in FIG. 5, when the control region is three symbols in length and there are 14 symbols in the subframe, the virtual carrier is eleven symbols long. However, if in the next subframe the control region of the host carrier were reduced to one symbol, there would be thirteen symbols available for the virtual carrier in that subframe.

When a virtual carrier is inserted into a LTE host carrier, mobile communication terminals receiving data on the virtual carrier need to be able to determine the number of symbols in the control region of each host carrier subframe to determine the number of symbols in the virtual carrier in that subframe if they are to be able to use all available symbols that are not used by the host carrier control region.

Conventionally, the number of symbols forming the control region is signalled in the first symbol of every subframe in the PCFICH. However, the PCFICH is typically distributed across the entire bandwidth of the downlink LTE subframe and is therefore transmitted on sub-carriers which virtual carrier terminals capable only of receiving the virtual carrier cannot receive. Accordingly, in one embodiment, any symbols across which the control region could possibly extend are predefined as null symbols on the virtual carrier, i.e. the length of the virtual sub-carrier is set at (m-n) symbols, where m is the total number of symbols in a subframe and n is the maximum number of symbols of the control region. Thus, resource elements are never allocated for downlink data transmission on the virtual carrier during the first n symbols of any given subframe.

Although this embodiment is simple to implement it will be spectrally inefficient because during subframes when the control region of the host carrier has fewer than the maximum number of symbols, there will be unused symbols in the virtual carrier.

In another embodiment, the number of symbols in the control region of the host carrier is explicitly signalled in the virtual carrier itself. Once the number of symbols in the control region of the host carrier is known, the number of symbols in the virtual carrier can be calculated by subtracting the total number of symbols in the subframe from this number.

In one example an explicit indication of the host carrier control region size is given by certain information bits in the virtual carrier control region. In other words an explicit signalling message is inserted at a predefined position in the virtual carrier control region 502. This predefined position is known by each terminal adapted to receive data on the virtual carrier.

In another example, the virtual carrier includes a predefined signal, the location of which indicates the number of symbols in the control region of the host carriers. For example, a predefined signal could be transmitted on one of three predetermined blocks of resource elements. When a terminal receives the subframe it scans for the predefined signal. If the predefined signal is found in the first block of resource elements this indicates that the control region of the host carrier comprises one symbol; if the predefined signal is found in the second block of resource elements this indicates that the control region of the host carrier comprises two symbols and if the predefined signal is found in the third block of resource elements this indicates that the control region of the host carrier comprises three symbols.

In another example, the virtual carrier terminal is arranged to first attempt to decode the virtual carrier assuming that the control region size of the host carrier is one symbol. If this is not successful, the virtual carrier terminal attempts to decode the virtual carrier assuming that the control region size of the host carrier is two and so on, until the virtual carrier terminal successfully decodes the virtual carrier.

Downlink Virtual Carrier Reference Signals

As is known in the art, in OFDM-based transmission systems, such as LTE, a number of sub-carriers in symbols throughout the subframes are typically reserved for the transmission of reference signals. As explained further below, reference symbols play a significant role in some embodiments of the invention. However, some conventional aspects of reference symbols are first described. Reference signals are conventionally transmitted on sub-carriers distributed throughout a subframe across the channel bandwidth and across the OFDM symbols. The reference signals are arranged in a repeating pattern and can be used by a receiver to estimate the channel function applied to the data transmitted on each sub-carrier using extrapolation and interpolation techniques. These reference signals are also typically used for additional purposes such as determining metrics for received signal power indications, automatic frequency control metrics and automatic gain control metrics. In LTE the positions of the reference signal bearing sub-carriers within each subframe are pre-determined and known at the transceiver of each terminal.

In a conventional LTE downlink subframes, there are a number of different reference signals, transmitted for different purposes. One example is the cell-specific reference signal, broadcast to all terminals. Cell-specific reference symbols are typically inserted on every sixth sub-carrier on each transmit antenna port on which they occur. Accordingly, if a virtual carrier is inserted in an LTE downlink subframe, even if the virtual carrier has a minimum bandwidth of one resource block (i.e. twelve sub-carriers) the virtual carrier will include at least some cell-specific reference signal bearing sub-carriers.

There are sufficient reference signal bearing sub-carriers provided in each subframe such that a receiver need not accurately receive every single reference signal to decode the data transmitted in the subframe. However, as will be understood the more reference signals that are received, the better a receiver will generally be able to estimate the channel response, and hence fewer errors will typically be introduced into the data decoded from the subframe. Accordingly, in order to preserve compatibility with LTE communication terminals receiving data on the host carrier, in accordance with some examples of the present invention, the sub-carrier positions that would contain reference signals in a conventional LTE subframe are retained in the virtual carrier, subject to the exceptions discussed further below in accordance with embodiments of the invention.

As will be understood, in accordance with examples of the present invention, terminals arranged to receive only the virtual carrier receive a reduced number of sub-carriers compared to conventional LTE terminals which receive each subframe across the entire bandwidth of the subframe. As a result, the reduced capability terminals receive fewer reference signals over a narrower range of frequencies which may result in a less accurate channel estimation being generated.

In some examples a simplified virtual carrier terminal may have a lower mobility which requires fewer reference symbols to support channel estimation. However, in some examples of the present invention the downlink virtual carrier may include additional reference signal bearing sub-carriers to enhance the accuracy of the channel estimation that the reduced capability terminals can generate (i.e. there may be a greater density of reference symbols on the virtual carrier as compared to other regions on the host carrier).

In some examples the positions of the additional reference bearing sub-carriers are such that they are systematically interspersed with respect to the positions of the conventional reference signal bearing sub-carriers thereby increasing the sampling frequency of the channel estimation when combined with the reference signals from the existing reference signal bearing sub-carriers. This allows an improved channel estimation of the channel to be generated by the reduced capability terminals across the bandwidth of the virtual carrier. In other examples, the positions of the additional reference bearing sub-carriers are such that they are systematically placed at the edge of the bandwidth of the virtual carrier thereby increasing the interpolation accuracy of the virtual carrier channel estimates.

Alternative Virtual Carrier Arrangements

Figure 12:
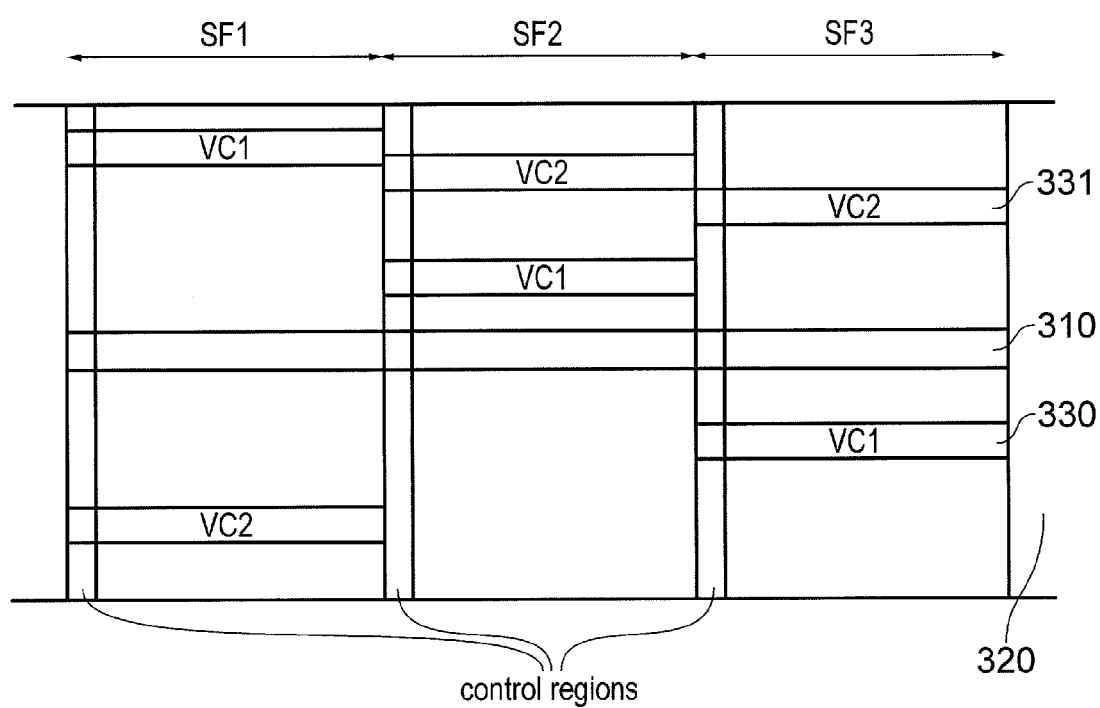
FIG. 12 provides a schematic diagram illustrating a group of subframes in which two virtual carriers change location within a host carrier band according to an embodiment of the present invention.

So far examples of the invention have been described generally in terms of a host carrier in which a single virtual carrier has been inserted as shown for example in FIG. 5. However, in some examples a host carrier may include more than one virtual carrier as shown for example in FIG. 12. FIG. 12 shows an example in which two virtual carriers VC1 (330) and VC2 (331) are provided within a host carrier 320. In this example, the two virtual carriers change location within the host carrier band according to a pseudo-random algorithm. However, in other examples, one or both of the two virtual carriers may always be found in the same frequency range within the host carrier frequency range and/or may change position according to a different mechanism. In LTE, the number of virtual carriers within a host carrier is only limited by the size of the host carrier. However, too many virtual carriers within the host carrier may unduly limit the bandwidth available for transmitting data to conventional LTE terminals and an operator may therefore decide on a number of virtual carrier within a host carrier according to, for example, a ratio of conventional LTE users/virtual carrier users.

In some examples the number of active virtual carriers can be dynamically adjusted such that it fits the current needs of conventional LTE terminals and virtual carrier terminals. For example, if no virtual carrier terminal is connected or if their access is to be intentionally limited, the network can arrange to begin scheduling the transmission of data to LTE terminals within the sub-carriers previously reserved for the virtual carrier. This process can be reversed if the number of active virtual carrier terminals begins to increase. In some examples the number of virtual carriers provided may be increased in response to an increase in the presence of virtual carrier terminals. For example if the number of virtual carrier terminals present in a network or area of a network exceeds a threshold value, an additional virtual carrier is inserted in the host carrier. The network elements and/or network operator can thus activate or deactivate the virtual carriers whenever appropriate.

The virtual carrier shown for example in FIG. 5 is 144 sub-carriers in bandwidth. However, in other examples a virtual carrier may be of any size between twelve sub-carriers to 1188 sub-carriers (for a carrier with a 1200 sub-carrier transmission bandwidth). Because in LTE the centre band has a bandwidth of 72 sub-carriers, a virtual carrier terminal in an LTE environment preferentially has a receiver bandwidth of at least 72 sub-carriers (1.08 MHz) such that it can decode the centre band 310, therefore a 72 sub-carrier virtual carrier may provide a convenient implementation option. With a virtual carrier comprising 72 sub-carriers, the virtual carrier terminal does not have to adjust the receiver's bandwidth for camping on the virtual carrier which may therefore reduce complexity of performing the camp-on process, but there is no requirement to have the same bandwidth for the virtual carrier as for the centre band and, as explained above, a virtual carrier based on LTE can be of any size between 12 to 1188 sub-carriers. For example, in some systems, a virtual carrier having a bandwidth of less than 72 sub-carriers may be considered as a waste of the virtual carrier terminal's receiver resources, but from another point of view, it may be considered as reducing the impact of the virtual carrier on the host carrier by increasing the bandwidth available to conventional LTE terminals. The bandwidth of a virtual carrier can therefore be adjusted to achieve the desired balance between complexity, resource utilization, host carrier performance and requirements for virtual carrier terminals.

Uplink Transmission Frame

So far, the virtual carrier has been discussed primarily with reference to the downlink, however in some examples a virtual carrier can also be inserted in the uplink.

In frequency division duplex (FDD) networks both the uplink and downlink are active in all subframes, whereas in time division duplex (TDD) networks subframes can either be assigned to the uplink, to the downlink, or further sub-divided into uplink and downlink portions.

In order to initiate a connection to a network, conventional LTE terminals make a random access request on the physical random access channel (PRACH). The PRACH is located in predetermined blocks of resource elements in the uplink frame, the positions of which are signaled to the LTE terminals in the system information signaled on the downlink.

Additionally, when there is pending uplink data to be transmitted from an LTE terminal and the terminal does not already have any uplink resources allocated to it, it can transmit a random access request PRACH to the base station. A decision is then made at the base station as to which if any uplink resource is to be allocated to the terminal device that has made the request. Uplink resource allocations are then signaled to the LTE terminal on the physical downlink control channel (PDCCH) transmitted in the control region of the downlink subframe.

In LTE, transmissions from each terminal device are constrained to occupy a set of contiguous resource blocks in a frame. For the physical uplink shared channel (PUSCH) the uplink resource allocation grant received from the base station will indicate which set of resource blocks to use for that transmission, where these resource blocks could be located anywhere within the channel bandwidth.

The first resources used by the LTE physical uplink control channel (PUCCH) are located at both the upper and lower edge of the channel, where each PUCCH transmission occupies one resource block. In the first half of a subframe this resource block is located at one channel edge, and in the second half of a subframe this resource block is located at the opposite channel edge. As more PUCCH resources are required, additional resource blocks are assigned in a sequential manner, moving inward from the channel edges. Since PUCCH signals are code division multiplexed, an LTE uplink can accommodate multiple PUCCH transmissions in the same resource block.

Virtual Uplink Carrier

In accordance with embodiments of the present invention, the virtual carrier terminals described above can also be provided with a reduced capability transmitter for transmitting uplink data. The virtual carrier terminals are arranged to transmit data across a reduced bandwidth. The provision of a reduced capability transmitter unit provides corresponding advantages to those achieved by providing a reduced capability receiver unit with, for example, classes of devices that are manufactured with a reduced capability for use with, for example, MTC type applications.

Figure 13A:
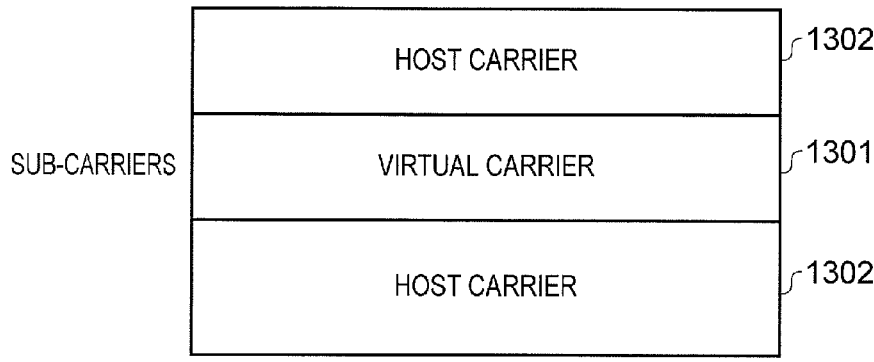
FIGS. 13A to 13C provide schematic diagrams illustrating LTE uplink subframes in which an uplink virtual carrier has been inserted in accordance with an embodiment of the present invention.

In correspondence with the downlink virtual carrier, the virtual carrier terminals transmit uplink data across a reduced range of sub-carriers within a host carrier that has a greater bandwidth than that of the reduced bandwidth virtual carrier. This is shown in FIG. 13A. As can be seen from FIG. 13A, a group of sub-carriers in an uplink subframe form a virtual carrier 1301 within a host carrier 1302. Accordingly, the reduced bandwidth across which the virtual carrier terminals transmit uplink data can be considered a virtual uplink carrier.

In order to implement the virtual uplink carrier, the base station scheduler serving a virtual carrier ensures that all uplink resource elements granted to virtual carrier terminals are sub-carriers that fall within the reduced bandwidth range of the reduced capability transmitter units of the virtual carrier terminals. Correspondingly, the base station scheduler serving the host carrier typically ensures that all uplink resource elements granted to host carrier terminals are sub-carriers that fall outside the set of sub-carriers occupied by the virtual carrier terminals. However, if the schedulers for the virtual carrier and the host carrier are implemented jointly, or have means to share information, then the scheduler of the host carrier can assign resource elements from within the virtual carrier region to terminal devices on the host carrier during subframes when the virtual carrier scheduler indicates that some or all of the virtual carrier resources will not be used by terminal devices on the virtual carrier.

If a virtual carrier uplink incorporates a physical channel that follows a similar structure and method of operation to the LTE PUCCH, where resources for that physical channel are expected to be at the channel edges, for virtual carrier terminals these resources could be provided at the edges of the virtual carrier bandwidth and not at the edges of the host carrier. This is advantageous since it would ensure that virtual carrier uplink transmissions remain within the reduced virtual carrier bandwidth.

Virtual Uplink Carrier Random Access

In accordance with conventional LTE techniques, it cannot be guaranteed that the PRACH will be within the sub-carriers allocated to the virtual carrier. In some embodiments therefore, the base station provides a secondary PRACH within the virtual uplink carrier, the location of which can be signaled to the virtual carrier terminals via system information on the virtual carrier. This is shown for example in FIG. 13B in which a PRACH 1303 is located within the virtual carrier 1301. Thus, the virtual carrier terminals send PRACH requests on the virtual carrier PRACH within the virtual uplink carrier. The position of the PRACH can be signaled to the virtual carrier terminals in a virtual carrier downlink signaling channel, for example in system information on the virtual carrier.

Figure 13B:
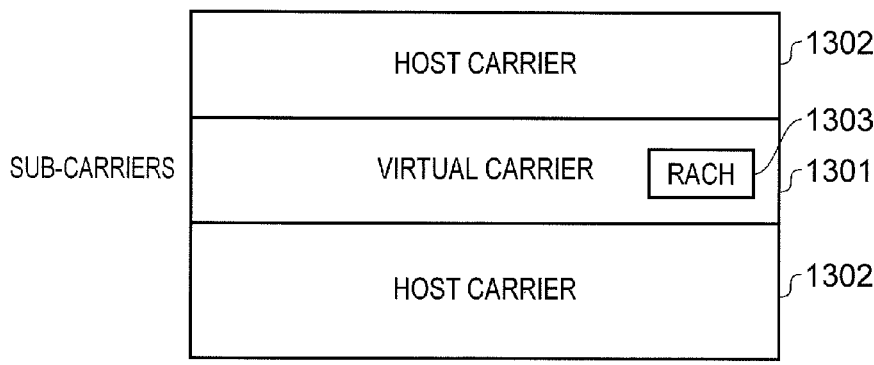
Figure 13C:
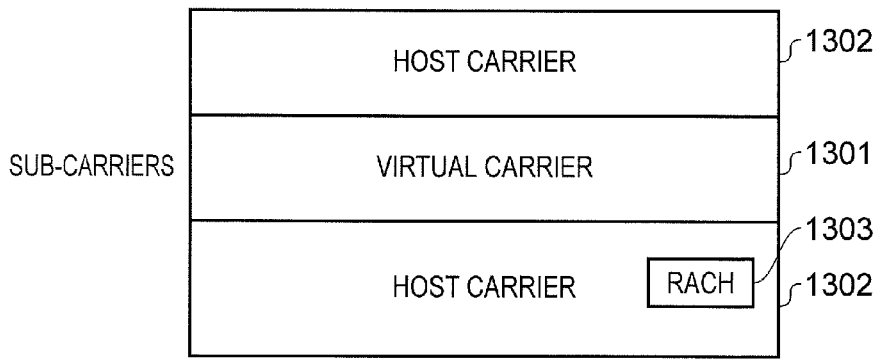

However, in other examples, the virtual carrier PRACH 1303 is situated outside of the virtual carrier as shown for example in FIG. 13C. This leaves more room within the virtual uplink carrier for the transmission of data by the virtual carrier terminals. The position of the virtual carrier PRACH is signaled to the virtual carrier terminals as before but in order to transmit a random access request, the virtual carrier terminals re-tune their transmitter units to the virtual carrier PRACH frequency because it is outside of the virtual carrier. The transmitter units are then re-tuned to the virtual carrier frequency when uplink resource elements have been allocated.

In some examples where the virtual carrier terminals are capable of transmitting on a PRACH outside of the virtual carrier, the position of the host carrier PRACH can be signaled to the virtual carrier terminals. The virtual carrier terminals can then simply use the conventional host carrier PRACH resource to send random access requests. This approach is advantageous as fewer PRACH resources have to be allocated.

However, if the base station is receiving random access requests from both conventional LTE terminals and virtual carrier terminals on the same PRACH resource, it is necessary that the base station is provided with a mechanism for distinguishing between random access requests from conventional LTE terminals and random access requests from virtual carrier terminals.

Therefore, in some examples a time division allocation is implemented at the base station whereby, for example, over a first set of subframes the PRACH allocation is available to the virtual carrier terminals and over a second set of subframes the PRACH allocation is available to conventional LTE terminals. Accordingly, the base station can determine that random access requests received during the first set of subframes originate from virtual carrier terminals and random access requests received during the second set of subframes originate from conventional LTE terminals.

In other examples, no mechanism is provided to prevent both virtual carrier terminals and conventional LTE terminals transmitting random access requests at the same time. However, the random access preambles that are conventionally used to transmit a random access request are divided into two groups. The first group is used exclusively by virtual carrier terminals and the second group is used exclusively by conventional LTE terminals. Accordingly, the base station can determine whether a random request originated from a conventional LTE terminal or a virtual carrier terminal simply by ascertaining to what group the random access preamble belongs.

Example Architecture

Figure 14:
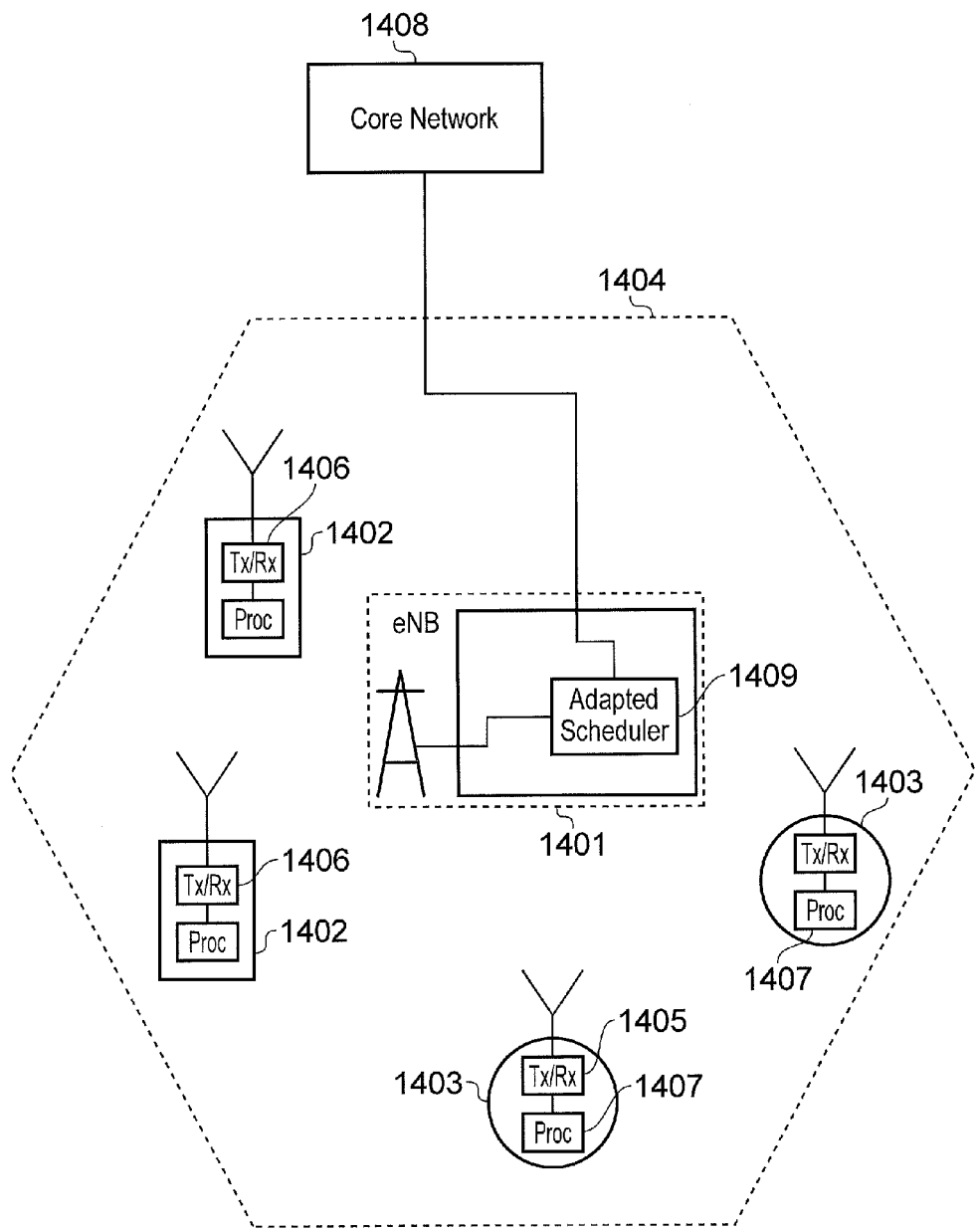
FIG. 14 provides a schematic diagram showing part of an adapted LTE mobile telecommunication network arranged in accordance with an example of the present invention.

FIG. 14 provides a schematic diagram showing part of an adapted LTE mobile telecommunication system arranged in accordance with an example of the present invention. The system includes an adapted enhanced Node B (eNB) 1401 connected to a core network 1408 which communicates data to a plurality of conventional LTE terminals 1402 and reduced capability terminals 1403 within a coverage area (cell) 1404. Each of the reduced capability terminals 1403 has a transceiver unit 1405 which includes a receiver unit capable of receiving data across a reduced bandwidth and a transmitter unit capable of transmitting data across a reduced bandwidth when compared with the capabilities of the transceiver units 1406 included in the conventional LTE terminals 1402.

The adapted eNB 1401 is arranged to transmit downlink data using a subframe structure that includes a virtual carrier as described with reference to FIG. 5 and to receive uplink data using a subframe structure as described with reference to FIG. 13B or 13C. The reduced capability terminals 1403 are thus able to receive and transmit data using the uplink and downlink virtual carriers as described above.

As has been explained above, because the reduced complexity terminals 1403 receive and transmit data across a reduced bandwidth on the uplink and downlink virtual carriers, the complexity, power consumption and cost of the transceiver unit 1405 needed to receive and decode downlink data and to encode and transmit uplink data is reduced compared to the transceiver unit 1406 provided in the conventional LTE terminals.

When receiving downlink data from the core network 1408 to be transmitted to one of the terminals within the cell 1404, the adapted eNB 1401 is arranged to determine if the data is bound for a conventional LTE terminal 1402 or a reduced capability terminal 1403. This can be achieved using any suitable technique. For example, data bound for a reduced capability terminal 1403 may include a virtual carrier flag indicating that the data must be transmitted on the downlink virtual carrier. If the adapted eNB 1401 detects that downlink data is to be transmitted to a reduced capability terminal 1403, an adapted scheduling unit 1409 included in the adapted eNB 1401 ensures that the downlink data is transmitted to the reduced capability terminal in question on the downlink virtual. In another example the network is arranged so that the virtual carrier is logically independent of the eNB. More particularly the virtual carrier may be arranged to appear to the core network as a distinct cell so that it is not known to the core network that the virtual carrier has any relationship with the host carrier. Packets are simply routed to/from the virtual carrier just as they would be for a conventional cell.

In another example, packet inspection is performed at a suitable point within the network to route traffic to or from the appropriate carrier (i.e. the host carrier or the virtual carrier).

In yet another example, data from the core network to the eNB is communicated on a specific logical connection for a specific terminal device. The eNB is provided with information indicating which logical connection is associated with which terminal device. Information is also provided at the eNB indicating which terminal devices are virtual carrier terminals and which are conventional LTE terminals. This information could be derived from the fact that a virtual carrier terminal would initially have connected using virtual carrier resources. In other examples virtual carrier terminals are arranged to indicate their capability to the eNB during the connection procedure. Accordingly the eNB can map data from the core network to a specific terminal device based on whether the terminal device is a virtual carrier terminal or an LTE terminal.

When scheduling resources for the transmission of uplink data, the adapted eNB 1401 is arranged to determine if the terminal to be scheduled resources is a reduced capability terminal 1403 or a conventional LTE terminal 1402. In some examples this is achieved by analysing the random access request transmitted on the PRACH using the techniques to distinguish between a virtual carrier random access request and a conventional random access request as described above. In any case, when it has been determined at the adapted eNB 1401 that a random access request has been made by a reduced capability terminal 1402, the adapted scheduler 1409 is arranged to ensure that any grants of uplink resource elements are within the virtual uplink carrier.

In some examples, the virtual carrier inserted within the host carrier can be used to provide a logically distinct "network within a network". In other words data being transmitted via the virtual carrier can be treated as logically and physically distinct from the data transmitted by the host carrier network. The virtual carrier can therefore be used to implement a so-called dedicated messaging network (DMN) which is "laid over" a conventional network and used to communicate messaging data to DMN devices (i.e. virtual carrier terminals).

Further Example Applications of Virtual Carriers

Having set out the concepts of virtual carriers of the kind described in co-pending UK patent applications numbered GB 1101970.0 [2], GB 1101981.7 [3], GB 1101966.8 [4], GB 1101983.3 [5], GB 1101853.8 [6], GB 1101982.5 [7], GB 1101980.9 [8] and GB 1101972.6 [9], GB 1121767.6 [10] and GB 1121766.8 [11], some extensions of the virtual carrier concept in accordance with embodiments of the invention are now described.

Figure 15A:
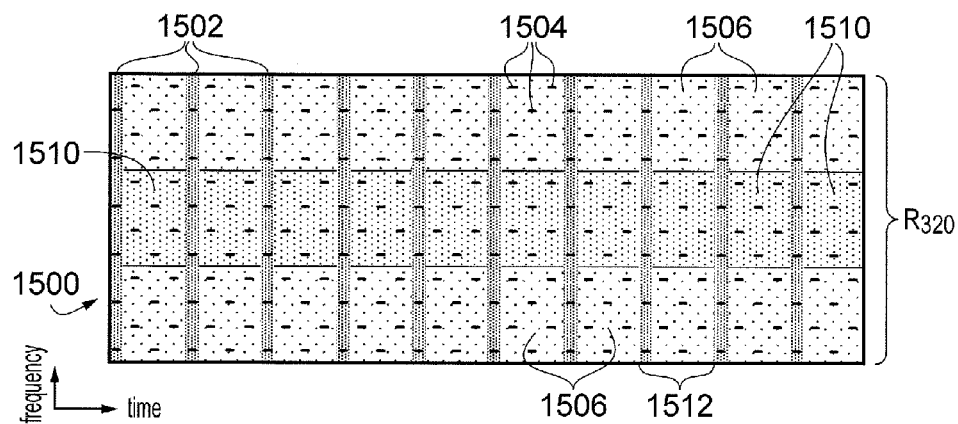
FIG. 15A schematically represents an example allocation of transmission resources between a host and virtual carrier in a LTE mobile telecommunication network arranged according to an embodiment of the invention.

FIG. 15A is a schematic diagram representing how various regions in a LTE-type telecommunications network's time-frequency transmission resource grid 1500 might be allocated for use to support a virtual carrier such as described above. The extent of the resource grid 1500 shown in FIG. 15A comprises 10 subframes 1512 (equivalent to one frame overall) spaced along the horizontal time direction and spans a bandwidth $R_{320}$ in frequency. Each subframe 1512 in FIG. 15A follows the same general format as the subframe in FIG. 5 but is represented in a more simplified and schematic manner.

Thus, the transmission resource grid 1500 of FIG. 15A comprises host carrier PDCCH regions 1502, host carrier PDSCH regions 1506, virtual carrier regions 1510 and reference symbol regions 1504. The virtual carrier regions 1510 may comprise separate virtual carrier PDSCH regions and virtual carrier PDCCH regions, such as schematically shown in FIG. 5 by the separate regions identified by reference numerals 501 and 502. However, and as noted above, in other example implementations the principles of the virtual carrier operation might not mirror these aspects of LTE-type networks. The reference symbol regions 1504 may be used solely for the host carrier, or these regions may also be received and used by terminals camped-on to the virtual carrier.

Figure 15B:
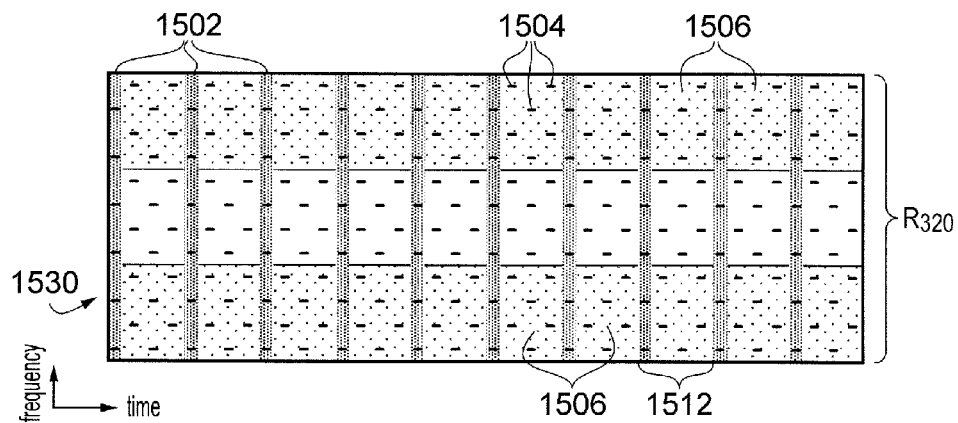
FIG. 15B schematically represents an example allocation of transmission resources for a host carrier in a LTE mobile telecommunication network arranged according to an embodiment of the invention.

FIG. 15B is similar to and will be understood from FIG. 15A, but whereas FIG. 15A schematically represents regions of the time-frequency transmission resource grid 1500 for both the host and virtual carriers, FIG. 15B schematically represents only regions associated with the host carrier (i.e. the host carrier PDCCH regions 1502, host carrier PDSCH regions 1506 and reference symbol regions 1504). In effect FIG. 15B represents what might be referred to as the host-carrier transmission resource grid 1530. The regions of FIG. 15B shown without shading are associated with the virtual carrier and do not "belong" to the host-carrier transmission resource grid 1530.

Figure 15C:
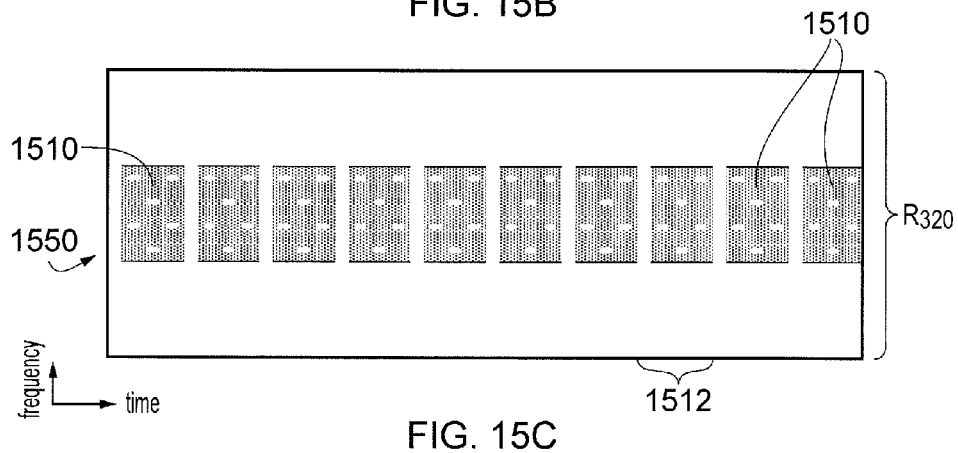
FIG. 15C schematically represents an example allocation of transmission resources for a virtual carrier in a LTE mobile telecommunication network arranged according to an embodiment of the invention.

FIG. 15C is also similar to and will be understood from FIG. 15A, but whereas FIG. 15A schematically represents regions of the time-frequency transmission resource grid 1500 for both the virtual and host carriers, FIG. 15C schematically represents only regions associated with the virtual carrier (i.e. the virtual carrier regions 1510). FIG. 15C is thus the counter-part to FIG. 15B. In effect FIG. 15C represents what might be referred to as the virtual-carrier transmission resource grid 1550. The regions of FIG. 15C shown without shading are associated with the host carrier and do not "belong" to the virtual-carrier transmission resource grid 1550.

The host-carrier transmission resource grid 1530 and virtual-carrier transmission resource grid 1550 complement one another in that one "fills" the spaces in the other so that when added together they correspond to the overall transmission resource grid 1510 of FIG. 15A. Thus to summarise some embodiments of the invention, communications are supported using a plurality of Orthogonal Frequency Division Multiplexing, OFDM, sub-carriers spanning a first frequency bandwidth (e.g. $R_{320}$ in FIGS. 15A to 15C). User-plane data may be communicated on the host carrier using a first group of the OFDM sub-carriers distributed across the first frequency bandwidth (e.g. in regions 1506 of FIG. 15B) and user-plane data may be communicated on the virtual carrier using a second group of the OFDM sub-carriers distributed across a second frequency bandwidth, wherein the second frequency bandwidth is smaller than and within the first frequency bandwidth (e.g. within regions 1510 of FIG. 15C). However, control-plane data for the host carrier (e.g. PDCCH) may be communicated using both groups of the OFDM sub-carriers (e.g. in regions 1502 of FIG. 15B).

Figure 16:
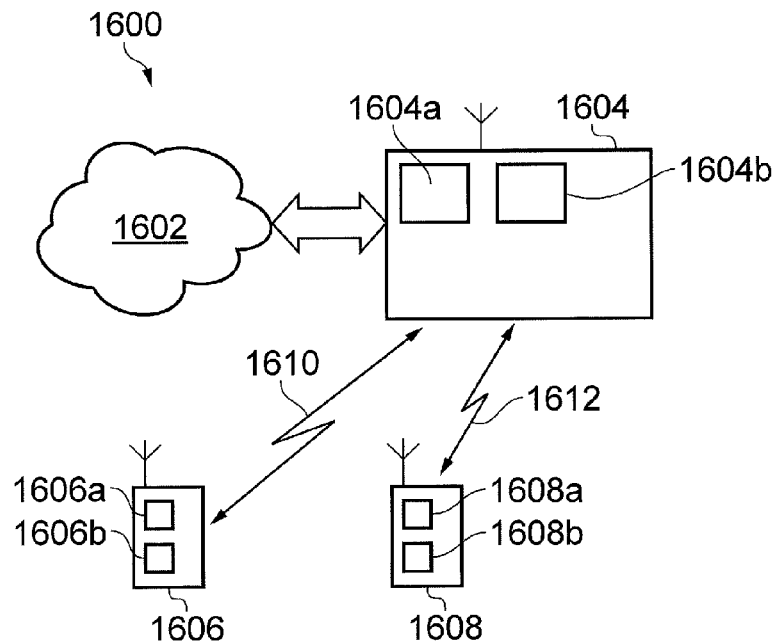
FIG. 16 schematically shows a mobile telecommunication network architecture according to an embodiment of the invention.

FIG. 16 schematically shows a telecommunications system 1600 according to an embodiment of the invention. The telecommunications system 1600 in this example is based broadly on an LTE-type architecture in which a virtual carrier, such as described above, is implemented. As such many aspects of the operation of the telecommunications system 1600 are known and understood and are not described here in detail in the interest of brevity. Operational aspects of the telecommunications system 1600 which are not specifically described herein may be implemented in accordance with any known techniques, for example according to the current LTE-standards with appropriate modifications to support a virtual carrier as has been previously proposed.

The telecommunications system 1600 comprises a core network part (evolved packet core) 1602 coupled to a radio network part. The radio network part comprises a base station (evolved-nodeB) 1604 coupled to a plurality of terminal devices. In this example, two terminal devices are shown, namely a first terminal device 1606 and a second terminal device 1608. It will of course be appreciated that in practice the radio network part may comprise a plurality of base stations serving a larger number of terminal devices across various communication cells. However, only a single base station and two terminal devices are shown in FIG. 16 in the interests of simplicity.

As with a conventional mobile radio network, the terminal devices 1606, 1608 are arranged to communicate data to and from the base station (transceiver station) 1604. The base station is in turn communicatively connected to a serving gateway, S-GW, (not shown) in the core network part which is arranged to perform routing and management of mobile communications services to the terminal devices in the telecommunications system 1600 via the base station 1604. In order to maintain mobility management and connectivity, the core network part 1602 also includes a mobility management entity (not shown) which manages the enhanced packet service, EPS, connections with the terminal devices 1606, 1608 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 1602 to an external packet data network, for example the Internet. As noted above, the operation of the various elements of the communications system 1600 shown in FIG. 16 may be broadly conventional apart from where modified to provide functionality in accordance with embodiments of the invention as discussed herein.

In this example, it is assumed the first terminal device 1606 is a conventional smart-phone type terminal device communicating with the base station 1604 primarily using resources associated with the host carrier component of the radio interface (e.g. such as represented in FIG. 15B). This first terminal device 1604 comprises a transceiver unit 1606a for transmission and reception of wireless signals and a controller unit 1606b configured to control the smart phone 1606. The controller unit 1606b may comprise a processor unit which is suitably configured/programmed to provide the desired functionality using conventional programming/configuration techniques for equipment in wireless telecommunications systems. The transceiver unit 1606a and the controller unit 1606b are schematically shown in FIG. 16 as separate elements. However, it will be appreciated that the functionality of these units can be provided in various different ways, for example using a single suitably programmed integrated circuit. As will be appreciated the smart phone 1606 will in general comprise various other elements associated with its operating functionality.

In this example, it is assumed the second terminal device 1608 is a machine-type communication (MTC) terminal device communicating with the base station 1604 using resources associated with the virtual carrier component of the radio interface (e.g. such as represented in FIG. 15C). As discussed above, these types of device may be typically characterised as semi-autonomous or autonomous wireless communication devices communicating small amounts of data. Examples include so-called smart meters which, for example, may be located in a customer's house and periodically transmit information back to a central MTC server data relating to the customer's consumption of a utility such as gas, water, electricity and so on. MTC devices may in some respects be seen as devices which can be supported by relatively low bandwidth communication channels having relatively low quality of service (QoS), for example in terms of latency. It is assumed here the MTC terminal device 1608 in FIG. 16 is such a device.

As with the smart phone 1606, the MTC device 1608 comprises a transceiver unit 1608a for transmission and reception of wireless signals and a controller unit 1608b configured to control the MTC device 1608. The controller unit 1608B may comprise various sub-units, such as a monitoring unit, an identifying unit, a determining unit, and an initiating unit for providing functionality in accordance with embodiments of the invention as explained further below. These sub units may be implemented as discrete hardware elements or as appropriately configured functions of the controller unit. Thus the controller unit 1608b may comprise a processor unit which is suitably configured/programmed to provide the desired functionality described herein using conventional programming/configuration techniques for equipment in wireless telecommunications systems. The transceiver unit 1608a and the controller unit 1608b are schematically shown in FIG. 16 as separate elements for ease of representation. However, it will be appreciated that the functionality of these units can be provided in various different ways following established practices in the art, for example using a single suitably programmed integrated circuit. It will be appreciated the MTC device 1608 will in general comprise various other elements associated with its operating functionality.

The base station 1604 comprises a transceiver unit 1604a for transmission and reception of wireless signals and a controller unit 1604b configured to control the base station 1604. The controller unit 1606B may again comprise various sub-units, such as a scheduling unit and a selecting unit for providing functionality in accordance with embodiments of the invention as explained further below. These sub units may be implemented as discrete hardware elements or as appropriately configured functions of the controller unit. Thus, the controller unit 1604b may comprise a processor unit which is suitably configured/programmed to provide the desired functionality described herein using conventional programming/configuration techniques for equipment in wireless telecommunications systems. The transceiver unit 1604a and the controller unit 1604b are schematically shown in FIG. 16 as separate elements for ease of representation. However, it will be appreciated that the functionality of these units can be provided in various different ways following established practices in the art, for example using a single suitably programmed integrated circuit. It will be appreciated the base station 1604 will in general comprise various other elements associated with its operating functionality.

Thus, the base station 1604 is configured to communicate data with the smart phone 1606 over a first radio communication link 1610 associated with a host carrier of the wireless telecommunications system and to communicate data with the MTC device 1608 over a second radio communication link 1612 associated with a virtual carrier of the wireless application system.

It is assumed here the base station 1604 is configured to communicate with the smart phone 1606 over the first radio communication link 1610 in accordance with the established principles of LTE-based communications supporting a host and virtual carrier, such as described above.

In accordance with previously proposed virtual carrier (VC) techniques, a VC terminal device (UE) in connected mode will search a control region (such as the control region 502 schematically represented in FIG. 5) to identify possible allocations of downlink transmissions from the base station which are scheduled for the VC terminal device (such as the MTC device 1608 presented in FIG. 16). This procedure on the virtual carrier may generally mirror the established techniques for LTE-based communications on a conventional carrier. Thus, the control region searched by the virtual carrier terminal device to identify resource allocations may correspond to what might be referred to as a VC-PDCCH. Searching VC-PDCCH for terminal device specific resource allocations consumes power at the terminal device. Furthermore, the consumed power is in effect wasted if in fact the base station has not scheduled any terminal device specific transmissions for the particular terminal device. The inventors have recognised that for MTC-type devices in particular, the typically bursty and sporadic nature of MTC-type communications means it will often be the case that no terminal device specific data are scheduled for transmission to a given terminal device. Accordingly, the process of decoding VC-PDCCH in each subframe can represent a significant yet unnecessary drain on a terminal device's resources.

MTC-type traffic can typically be reasonably well predicted in advance by a network (and in particular by a scheduler in a base station). Furthermore even for unpredictable MTC-type traffic the traffic is in any case typically not tightly time-bounded (i.e. the data is delay tolerant). This means there is generally a significant degree of flexibility available to a base station in the scheduling of MTC-type data/traffic. That is to say, a scheduling unit in a base station can plan to manage the transmission of data to MTC-type devices over relatively long periods without significant impact on operational performance for the devices. For example, a base station may schedule MTC-data relatively far in advance on a virtual carrier because the virtual carrier is restricted in bandwidth resource and, particularly if there are a significant number of MTC devices needing broadly simultaneous downlink resources (for example to broadcast a tariff change to a plurality of smart meters), it may not be possible to schedule all relevant MTC terminal devices in one subframe. As explained above, any VC-terminal devices which are not scheduled in a given subframe will in effect waste energy if they decode the virtual carrier control region for that subframe. Unnecessary consumption of energy can be a particular concern for MTC terminal devices because they may typically be designed to operate with relatively long intervals between battery replacements or re-charges.

This scheduling profile and desire to reduce power consumption makes MTC-type devices well-suited to techniques which allow the devices to enter reduced-activity (sleep/suspension) modes, such as the known DRX and microsleep modes. However, as discussed above, there are drawbacks with these established sleep modes and so alternative techniques for controlling a terminal device to enter a reduced-activity mode in a wireless telecommunications network are proposed in accordance with embodiments of the invention. The proposed techniques are well suited to MTC-type devices operating on a virtual carrier.

Figure 17:
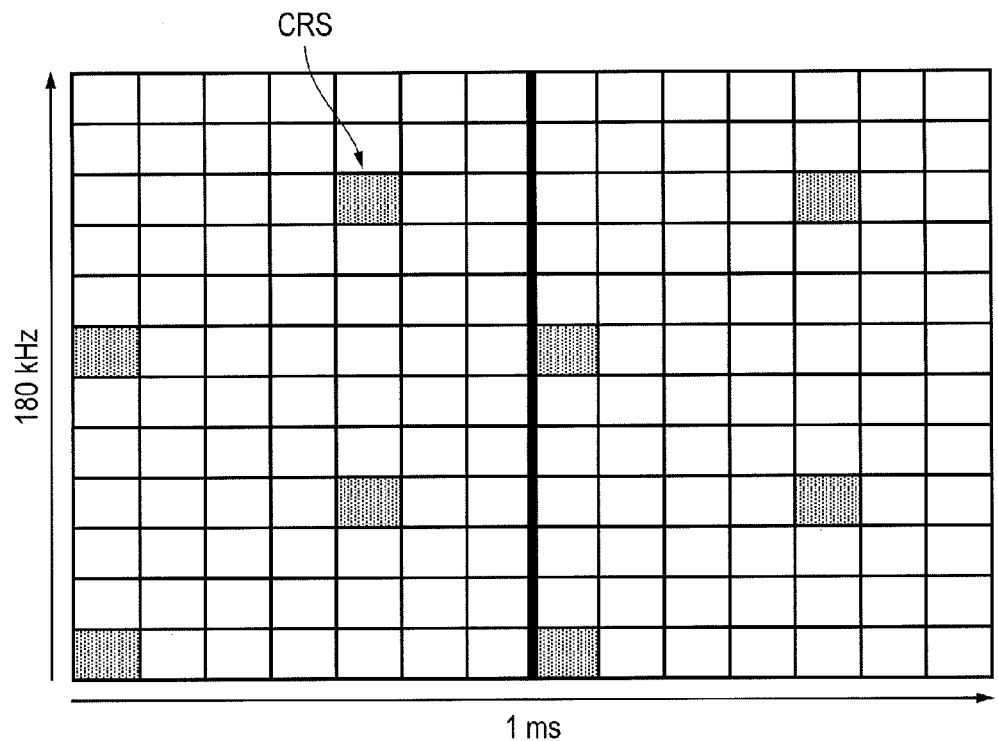
FIG. 17 schematically represents locations for cell-specific reference symbols in a portion of a downlink radio subframe.

As explained above, an established aspect of LTE-type communications, including LTE-type telecommunications on a virtual carrier, is the use of reference symbols. These are interspersed throughout the time/frequency resource grid of a downlink subframe to provide for channel estimation and other purposes in accordance with known techniques. FIG. 17 schematically represents an arrangement of cell specific reference symbols (CRS) in accordance with conventional LTE techniques. FIG. 17 shows a region of an LTE-type downlink radio frame structure corresponding to 2 resource blocks (extending for 1 ms in time (one subframe/ 14 symbols) and 180 kHz in bandwidth (12 subcarriers)). In accordance with current LTE standards the extent of the resource grid represented in FIG. 17 will contain eight cell-specific reference symbols. As is well established, the specific locations for cell-specific reference symbols transmitted by a base station are determined according to parameters such as the cell identity and antenna port. A terminal device connected to the base station is thus able to locate and decode the reference symbols transmitted by the base station for channel estimation purposes.

In accordance with embodiments of the invention, a base station is configured to suppress transmission of one or more reference symbols in one or more radio subframes as a means of conveying to a terminal device receiving the reference symbols that it should enter a reduced activity state/mode for a defined period of time. The defined period of time may be established by the terminal device based on which reference symbol(s) have been suppressed. Thus, a scheduling unit in a base station may establish that a terminal device or group of terminal devices is not scheduled to receive any terminal-device specific data for a period of time, and the base station may communicate this information to the terminal device(s) through suppression of an appropriate reference symbol in accordance with a pre-established correspondence between reference symbols and potential period of time. Terminal device(s) monitoring the reference symbols transmitted by the base station may thus identify the suppression of the reference symbol (e.g. because it is not received), determine from the identity(ies)/location(s) of the reference symbol(s) which is(are) suppressed that the terminal device is not scheduled to receive any (or a particular type of) terminal device specific data for the corresponding period of time, and enter a reduced activity mode. For example, the terminal device may enter a reduced activity mode in which the terminal device does not decode control information regarding resource allocations for the determined period of time.

Communicating information regarding periods of time during which terminal devices may suspend certain (or all) decoding tasks through selective puncturing (suppression) of reference symbol transmissions by a base station in this way allows such information to be carried implicitly at the physical layer. Accordingly, this signalling to indicate that a reduced-activity mode may be entered for a given period of time can be sent quickly and without using resource-hungry RRC signalling.

Where cell specific reference symbols are suppressed there will generally be a plurality of terminal devices receiving the cell specific reference symbols and these plurality of terminal devices may all respond in the same way (i.e. so multiple terminal devices can be controlled to enter a reduced activity state for the same period). For example, it may be helpful to instruct all terminal devices on a virtual carrier to enter a reduced activity mode because the virtual carrier is to be suspended for a period of time to accommodate more data for devices not using the virtual carrier. In other examples, and as explained further below, different terminal devices may be configured to respond to different suppressed reference symbols in different ways, thereby allowing the base station to selectively control subsets of terminal devices to enter the reduced activity state. For example, one subset of terminal devices might comprise smart meters associated with company A, while another subset of terminal devices might comprise smart meters associated with company B, and activation of a reduced activity state for each company's devices might be separately controlled. However, embodiments of the invention are not restricted to suppression of cell specific reference symbols. For example, in accordance with some embodiments the base station may be configured to suppress UE specific reference symbols (e.g. DM-RS) that a particular terminal device (UE) is otherwise expecting, thereby providing a scheme for communicating to a specific terminal device that it may enter the reduced activity state for a particular period of time. Similarly, other embodiments of the invention may be based around suppression of demodulation reference symbols and/or channel state information reference symbols and/or positioning reference symbols.

Embodiments of the invention may thus allow for reduced power consumption in terminal devices by reducing the signal processing to be performed in subframes during which the terminal device is instructed to suspend decoding of certain transmissions it would otherwise decode, for example VC-PDCCH, and also reduced power consumption by terminal device transceivers during these subframes.

By comparison to the known technique of DRX, embodiments of the invention can also reduce the latency associated with a VC-terminal device resuming connected mode access to the network. Thus embodiments of the invention may combine an ability to achieve power savings from disabling some parts of receive processing, as in DRX, but without the increased latency that DRX brings. Furthermore, whereas DRX is controlled at RRC, whereas embodiments of the invention are controlled at the physical layer (possibly with some initial higher-layer setup/configuration signalling as discussed further below), a suspended decoding/reduced activity mode may be activated in accordance with embodiments of the invention more quickly than for DRX and with less overhead resource usage.

By comparison to the known technique of PDCCH microsleep, embodiments of the invention may also provide signal processing power savings because the terminal devices need not search and decode control information (e.g. PDCCH) for subframes in which decoding suspension/reduced activity mode is indicated. What is more, with the microsleep technique a terminal device must "awake" to decode PDCCH in each and every subframe, thereby restricting the length of time for which the terminal device can save power. In accordance with embodiments of the invention, a period of time greater than an individual subframe can readily be set as the duration of a reduced activity mode.

A consequence of a suppressed reference symbol approach in accordance with embodiments of the invention is that in some cases a terminal device which fails to correctly receive a reference symbol that is in fact transmitted by the base station, for example because of interference, may erroneously enter a reduced activity mode. If a base station then transmits data to the terminal device the terminal device will fail to receive it. However, the established retransmission protocols of LTE, for example based around ACK/NACK signalling, can be used to automatically alert the base station to the need to retransmit the data. Also, and as explained further below, in accordance with some embodiments of the invention there are techniques that can be adopted to reduce the risk of this happening.

Thus, in accordance with one embodiment of the invention, it is assumed that a downlink scheduler (scheduling unit) in a base station supporting a virtual carrier has determined that it will not schedule a certain type of terminal-specific downlink data for a VC terminal device for a particular number of subframes, although it wishes to resume transmissions (or at least the possibility of transmissions) to the terminal device after that number of subframes. It will be appreciated that a scheduler may establish this in accordance with any known techniques for scheduling transmissions in a wireless telecommunications system.

To convey this information to the terminal device (thereby allowing the terminal device to enter the reduced activity mode), the base station is configured to signal to the terminal device that the terminal device need make no attempt to locate or decode VC-PDCCH (or other decoding according to the implementation at hand) for the relevant number of subframes. This may be signalled, for example, in the final subframe before the suspension of transmission to the terminal device is to begin. As explained above, in accordance with embodiments of the invention the base station may convey the information through signalling at the physical layer by suppressing transmission of a particular reference signal (RS) in a particular resource element (RE) (or a combination of multiple reference symbols) where the terminal device is otherwise expecting it to occur in accordance with an established pattern of reference symbols for the wireless communication system.

A terminal device monitoring the reference symbols will identify that the suppressed reference symbol is not received, and may be configured to determine from this that it may enter a reduced activity state in which it suspends decoding of VC-PDCCH for the relevant period of time. As mentioned above, this process may be based on any of cell specific reference symbols (CRS), demodulation reference symbols (DM-RS) (UE specific reference symbols), control state indicator reference symbols (CSI-RS), or positioning reference symbols (P-RS) which are being transmitted to a relevant terminal device in a relevant subframe.

In a simple implementation a terminal device may be configured to enter a reduced activity state for a fixed number of subframes, for example 10 subframes, whenever it identifies that an expected reference symbol is not received. However, in general it may be preferable to provide more flexibility in the information communicated to a terminal device (example different durations of reduced activity). This can be done, for example, by establishing a correspondence between particular reference symbols and particular periods of time such that suppression of different reference symbols conveys an indication that a terminal device may enter a reduced activity mode for different periods of time. Such a correspondence can be established in a standard of the wireless communication system, or may be established by a base station and communicated to terminal devices using higher layer signalling, for example during a camp-on procedure when a terminal device first connects to the base station. There are many different forms of correspondence that can be established. For example, in some cases it may be established that a particular suppressed reference symbol (or combination of reference symbols) in any resource block corresponds with a particular period of time (i.e. the choice of punctured reference symbol with a resource block/subframe conveys information). In other cases it may be established that suppression of any reference symbol in a particular resource block corresponds with a particular period of time (i.e. the choice of resource block/subframe containing a punctured reference symbol conveys the information).

Figure 18:
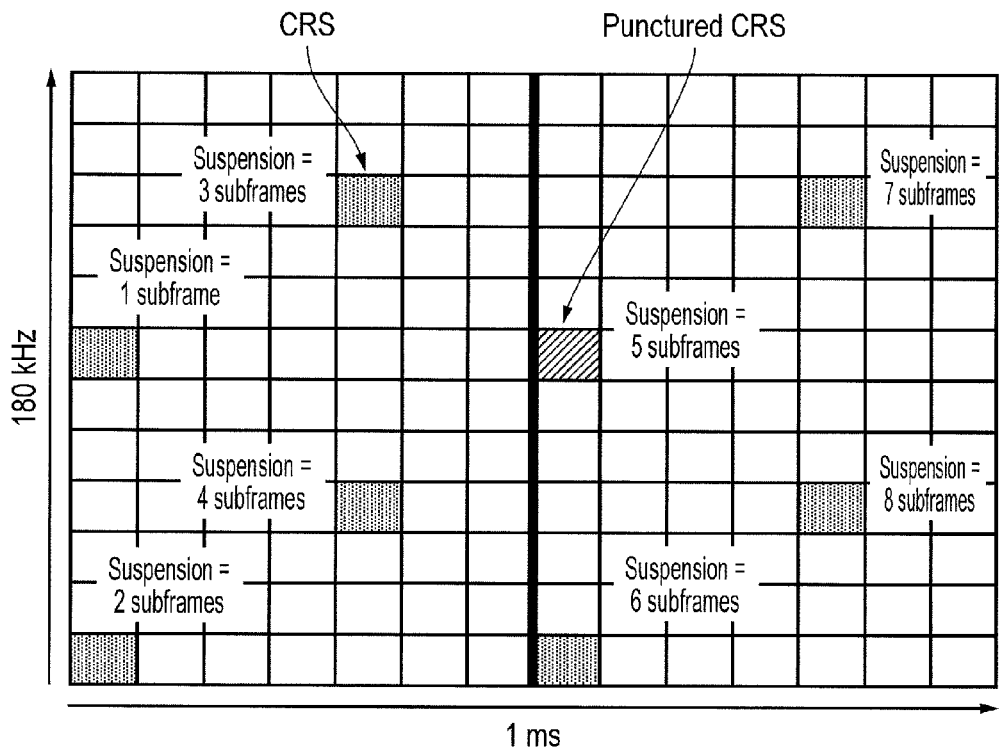
FIG. 18 schematically shows a correspondence between different cell-specific reference symbols and different potential periods of time for which a terminal device may be controlled to enter a reduced activity state in accordance with an embodiment of the invention by suppression of transmission of the corresponding reference symbol.

FIG. 18 schematically represents a correspondence between reference symbols and potential periods of time for which decoding may be suspended by a terminal device in accordance with an embodiment of the invention. FIG. 18 is similar to, and will be understood from, FIG. 17. However, in accordance with an embodiment of the invention, the base station and the terminal device(s) operating in a wireless telecommunications system configured to implement an embodiment of the present invention are both aware of a pre-established correspondence between individual reference symbols in each resource block pair of a subframe and a potential period of time for which terminal device decoding may be reduced (i.e. at least partially suspended). An example correspondence is schematically represented in the figure. This allows a base station to convey an indication that a terminal device may enter a reduced activity state for any number of subframes between one and eight depending on which reference symbol is suppressed/punctured. Longer periods of time can be indicated by suppressing multiple reference symbols. For example, a suspension of 14 subframes might be indicated by suppressing the reference symbol corresponding with a suspension of 6 subframes and the reference symbol corresponding with a suspension of 8 subframes. In the example represented in FIG. 18 a reference symbol established as corresponding to a suspension of 5 subframes is schematically represented as being punctured (not transmitted). Thus, the base station does not transmit this reference symbol. A terminal device implementing an embodiment of the invention recognises this reference symbol has been suppressed, and may accordingly initiate a reduced activity mode starting from the following subframe for a period of five subframes. Assuming only a single reference symbol is to be punctured (to minimise the impact on devices using the reference symbols for conventional channel estimation), the correspondence represented in FIG. 18 allows for 8 possible durations of decoding suspension to be indicated (i.e. one per CRS location). Thus, in the narrowest system bandwidth currently supported in LTE (1.4 MHz bandwidth—equivalent to a width of 72 subcarriers/six resource blocks) there are 48 possible durations which could be indicated with each requiring only a single reference symbol to be suppressed. Thus, there can be significant flexibility in how long terminal devices can be controlled to enter a reduced activity state with relatively low impact on other devices using the reference symbols for channel estimation. Conventional channel estimation techniques allow for the possibility of "lost" reference symbols, for example because of interference, and so a conventional terminal device not implementing an embodiment of the invention will be able to continue operating as normal even with the deliberate selective suppression of reference symbol transmissions.

In the case that more than one reference symbol may be suppressed/punctured within the 1.4 MHz bandwidth of a single subframe, a correspondingly expanded number of options regarding the potential suspension durations that may be communicated (or other elements of information as described further below) can be conveyed according to how many potential puncturing patterns are defined. For example, if any combination of two reference symbols may be suppressed to indicate different potential decoding suspension durations, then in the case of CRS such as illustrated above, there are 48C2=(48*47/2)=1128 possible different durations which can be indicated in the narrowest system bandwidth of 6 resource blocks width.

As noted above, suppression of reference symbols may degrade the performance of the channel estimation process for conventional "legacy" devices relying on the reference symbols for channel estimation. However, this can be mitigated by ensuring only a relatively small fraction of reference symbols are suppressed (for example less than 5%). Furthermore, more advanced terminal devices, even if not implementing an embodiment of the invention, may be configured to receive signalling from a base station indicating which reference symbols may be suppressed to help them maximise the channel estimation process.

In a case where the base station may not be aware as to whether a particular terminal device will be decoding a particular reference symbol it wishes to puncture, such as when DM-RS and CRS are both transmitted in transmission mode 7, one approach may be to configure puncturing of reference symbols on all relevant reference symbols, and include in a higher-layer configuration step, for example during a camp on procedure, an indication to respond to only one of them.

In the above example it is assumed suppression of a reference symbol corresponds with not transmitting a reference symbol. However, in other examples suppressing a reference symbol may involve simply transmitting the reference symbol at a different power as compared to other reference symbols, for example, a power which is lower than an average power for the reference symbols by more than a threshold amount. In a more advanced implementation a base station may identify that a terminal device which is to be controlled into a reduced activity state mode is located a long way from the base station such that the base station may transmit a reference symbol with sufficiently low power that it cannot be received by the remote terminal device, but can still be received by closer terminal devices, albeit with reduced power. Broadly similar principles can be applied using beam forming to control where in a cell a reference symbol will appear to be suppressed as compared to other locations.

In accordance with some embodiments of the invention reference symbols which may be punctured to convey suspension information may be transmitted on more than one antenna port of the base station. In this case, the puncturing might not be applied to all antenna ports. Furthermore, the different possible combinations of antenna ports on which the puncturing of particular resource elements may be applied can be used to indicate more possible options for configuring terminal devices into respective reduced activity states. For example, for reference symbols transmitted using antenna ports 'a' and 'b', puncturing on only port 'a', on only port 'b', or on both port 'a' and port 'b' serve as three more states for conveying information.

One example usage of this approach could be in the case of a base station and terminal device supporting 4-port transmission of, e.g. CRS. On ports 2 and 3, the reference symbol density is half that of ports 0 and 1, taking account of the fact that if the system is using high-order spatial-multiplexing provided by four ports, the radio channel is inherently likely to be one having high SINR and low mobility, and thus can be well-estimated with reduced reference symbol overhead. However, if the system is using fewer than four ports for PDSCH transmissions, then reference symbol puncturing in accordance with embodiments of the invention could be applied to the unused port(s) to reduce degradation of channel estimation on the ports for which PDSCH transmission is expected to occur.

In accordance with another embodiment of the invention the selected reference symbol puncturing may also be used to indicate further information, for example a delay until the suspension begins. For example, in a simple case some reference symbols in a subframe may be used to indicate different potential periods of time for which a terminal device may enter a reduced activity state, whilst other reference symbols in the subframe may be used to indicate a delay (e.g. in terms of a number of subframes following the current subframe), after which the period of reduced activity is to begin. Thus, the base station may suppress one reference symbol to indicate a duration for the reduced activity state and another reference symbol to indicate a start time for entering the reduced activity state, or one reference symbol may indicate both the delay after which the reduced activity is to begin and its duration, for example based on a pre-established correspondence between different reference symbols that might be suppressed and different combinations of these parameters.

In accordance with some embodiments the selective suppression of specific reference symbols may be used to indicate patterns of future subframes for which the terminal device may enter a reduced activity state rather than simply a single continuous period. For example, a subset of reference symbols may be associated with different durations of reduced activity state, whilst other reference symbols may be associated with different patterns for application of the reduced activity state. For example, suppression of a particular reference symbol may be associated with an indication that a reduced activity state should be cyclically entered. Thus, the base station may suppress one reference symbol to indicate a particular duration for a reduced activity state, such as described above, and also suppress in the same, or a related, subframe, a reference symbol to indicate this state may be repeatedly entered. A terminal device may respond by entering the reduced activity state for the appropriate duration, and then exit the reduced activity state for the same duration, and then re-enter the reduced activity state for the duration, and so forth. The terminal device may be configured to continue to do this until the base station suppresses another reference symbol associated with deactivating this mode of operation (it will be appreciated that where the present description refers to suppression of particular reference symbols to indicate corresponding information, this should be interpreted as also referring to suppressing particular combination of reference symbols to indicate corresponding information). Different patterns for entering and exiting the reduced activity state can be associated with different reference symbols in association with a pre-established scheme.

Thus in accordance with some embodiments of the invention the selective suppression of specific reference symbols (or combinations of reference symbols) can be used to also convey further information from the base station to the terminal device. That is to say, the selective suppression of at least one reference symbol may be used to convey information generally from the base station to the terminal device(s), and not just information regarding a period of time during which the terminal device may enter a reduced activity state. For example, a combination of a delay duration indicated by suppression of a reference symbol in a subframe, and the subframe number in which it is indicated, could be used to convey information regarding the width (in terms of symbols) of the PDCCH control region of the host carrier in which a terminal device is to resume decoding the virtual carrier PDCCH. This could therefore simplify the process of the terminal device determining the location of the VC-PDCCH in the first subframe after suspension of decoding (for example, where the virtual carrier PDCCH immediately follows the host carrier PDCCH, as opposed to being at the end of the subframe as schematically represented in FIG. 5). However, this approach would potentially restrict the scheduling flexibility of the base station in the first subframe after suspension since a promise has already been made regarding the width of the control region before it can be guaranteed that it is correct when the time comes to transmit it. There are various approaches for handling this where such a feature is implemented, such as (a) simply tolerating the scheduling inefficiency; or (b) if the inefficiency is judged too great, simply breaking the promise made to the VC-terminal device. In the latter case, the terminal device may fail to properly decode the virtual carrier PDCCH in the first subframe after expiry of the period of the reduced activity on its first attempt. However, the terminal device can resort to blind decoding over the remaining possible PDCCH control-region widths until it is successful.

The above-described embodiments have focused on how a terminal device might be configured to suspend decoding of a virtual carrier control region associated with the transmission of terminal device specific information. However, in accordance with different embodiments of the invention there may be different degrees of suspension in the reduced activity state. For example, as well as suspending the decoding of VC-PDCCH, and hence also the virtual carrier PDSCH, in other examples a terminal device might suspend decoding of an entire subframe, for example including all reference symbols, PBCH, and synchronisation signalling, or any subset of these. This may in some circumstances be less desirable since a terminal device might, for example, lose synchronisation with the cell or be unaware of changes to the MIB, but some further power saving at the device would be achieved which could be desirable in some MTC applications.

As noted above, suppression of reference symbols in accordance with embodiments of the invention could potentially reduce the quality of channel estimation or feedback for terminal devices which are operating in the wireless telecommunications network and using the reference symbols for channel estimation. In accordance with some embodiments non-suppressed reference symbols could be transmitted with higher power (power-boosted) to increase the reliability with which terminal devices can detect these reference symbols. The transmission powers of the reference symbols could be signalled to terminal devices using existing means.

As also noted above, it may in principle happen that, although the base station does transmit a reference symbol in a given resource element, the transmission may not be properly received by the terminal device. The terminal device may thus interpret this incorrectly as an indication to suspend VC-PDCCH decoding. Thus, in accordance with some embodiments, there may be a requirement for multiple reference symbols to be identified as suppressed before entering a reduced activity state. For example, in one example there may be a requirement for a particular reference symbol puncturing pattern to be detected in two or more subframes for a terminal device to interpret this as a positive indication that it may enter a reduced activity state for a given period.

It will be appreciated that there are an enormous number of different ways in which specific information may be conveyed through suppression/puncturing of reference symbols in accordance with embodiments of the invention. For example, the correspondence mappings represented in FIG. 18 provides a simple scheme for communicating a potential period of inactivity of between one and eight subframes within the portion of the downlink subframe represented in the figure. As has been mentioned, for a virtual carrier bandwidth of 1.4 MHz, there would be 48 possible puncturing locations for CRS in one subframe (TTI). Following the simple approach of FIG. 18, this would allow communication of potential suspension periods of between 1 and 48 subframes (ms) with single resource element puncturing. However, it will be appreciated that in any given implementation there is a large degree of freedom in mapping specific reference symbols to specific potential periods for which a terminal device may enter a reduced activity state in accordance with embodiments of the invention. The correspondence between particular reference symbols and potential periods of time for the terminal device made a reduced activity state may be established in a look-up table. Such a look-up table may be defined in accordance with a standard of the wireless telecommunications system, or may be established by a base station in accordance with current conditions, and then communicated to terminal devices using higher layer signalling, for example during a camp-on procedure. In effect, the relationship between individual reference symbols and corresponding period of time in a given implementation may be entirely arbitrary. In other examples there may be a formulaic relationship between reference symbols selected for suppression and corresponding periods of suspension.

For example, in one look-up table based example it may be decided that providing for values of between 1 ms and 48 ms in 1 ms increments is appropriate. However, in another example it may be considered preferable to allow for longer periods of suspension. Thus, perhaps 30 reference symbols will be associated with periods of time from 1 to 30 ins, and the remaining 18 reference symbols may be associated with significantly longer periods of time.

In some cases it may be desirable for a base station to be able to selectively indicate to different identities of terminal device that the device may enter a reduced activity state. In accordance with some embodiments of the invention, such an indication may also be provided based on the selective suppression of at least one reference symbol. Thus, in accordance with some embodiments, a reference symbol puncturing location may be used for not only indicating a suspension duration, but also for indicating a terminal device identification. This may be achieved, for example, by in effect allocating certain reference symbols to certain connected terminal devices. These may be allocated during a camp-on procedure for each terminal device or through other explicit signalling between the base station and the terminal device. For example, referring to the above case where there are 48 potential reference symbols for suppression in a given subframe of a 1.4 MHz bandwidth virtual carrier, if there are eight connected terminal devices implementing an embodiment of the invention, each terminal device may be associated with a group of six reference symbols, thereby allowing the base station to individually control each of the eight terminal devices to enter a reduced activity state for six potential periods (one per reference symbol allocated to the terminal device). A drawback of this approach is a reduction in the number of potential durations that may be signalled to a terminal device with increasing number of terminal devices which are to be individually addressed.

As well as using this approach to address individual terminal devices, a similar scheme could be used to address groups of terminal devices. For example, terminal devices might be associated with a number of groups of terminal devices (e.g. smart meters belonging to different companies). Terminal devices belonging to one company may all be associated with a first subset of reference symbols whilst terminal devices belonging to a different company may all be associated with a different subset of reference symbols. Thus, the base station can control the terminal devices of each company by appropriate puncturing of the reference symbols associated with the terminal devices of that company. Again, the association between reference symbols and terminal device identities can be established through prior higher layer signalling (i.e. higher than a physical layer), for example during a camp-on procedure, or in principle can be standardised in the wireless telecommunications system.

When addressing groups of terminal devices as exemplified above, groups of terminal devices whose durations of reduced activity states are multiples of one another, such as when the durations are an even number of subframes or for example when they are durations in subframes of powers of two, will potentially all resume ordinary processing in the same subframe. This could make it difficult for the scheduler in the base station to allocate resources to all the awakening terminal devices. Therefore, different groups of terminal devices may be associated with durations of the reduced activity state which are not multiples of one another, such as durations of prime numbers of milliseconds, or odd numbers of milliseconds.

Figure 19:
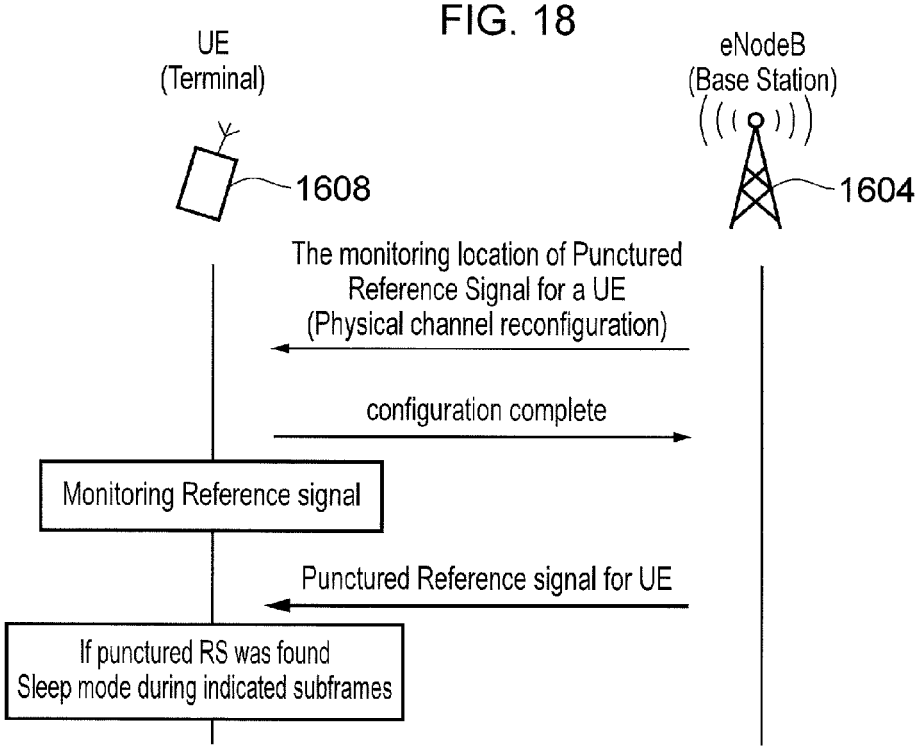
FIG. 19 is a ladder-type diagram schematically showing for some signalling steps between a base station and a terminal device in accordance with an embodiment of the invention.

As noted above, a mapping between a reference symbol puncturing pattern and a terminal device identifier may be established by the base station and communicated to a terminal device through explicit signalling, such as RRC signalling. An example of this approach is schematically represented in FIG. 19 which shows a ladder-type diagram for some signalling steps between the base station 1604 and the terminal device 1608 of FIG. 16 in accordance with an embodiment of the invention. In a first step, for example in association with a camp-on procedure, the base station 1604 configures the terminal device via RRC signalling with the location(s) of potentially punctured reference symbols which are allocated to that terminal device and which that terminal device should subsequently monitor for possible suppression (in a grouped-device scenario, multiple terminal devices may be configured to monitor the same reference symbols). In response to receiving the configuration information from the base station, the terminal device 1608 responds to the base station to indicate when the configuration is complete. The terminal device 1608 may then proceed to monitor the relevant reference signals to seek to identify any suppressions. As represented in FIG. 19, the base station sends a punctured reference signal for the UE to indicate the UE may enter a period of reduced activity in accordance with the principles described above. The terminal device detects the punctured reference symbol and enters the reduced activity state (sleep mode) for the subframes associated with the punctured reference symbol received from the base station. Other terminal devices may be configured to respond to the suppression of other reference symbols, thereby allowing the base station to selectively control activation of the reduced activity mode at different terminal devices through suppression of the relevant reference symbols.

In other embodiments of the invention, different reference symbols which may be suppressed may be associated with different terminal devices through implicit signalling based on an existing identifier for the terminal device. In LTE there is a range of different identifiers for terminal devices, such as a device's IMSI (international mobile subscriber identity) or C-RNTI (cell-radio network temporary identifier). These identifiers are generally too large to be directly addressed through different, combinations of suppressed reference symbols, although in principle this could be done with a sufficiently large set of reference symbols which may be punctured, for example a set spanning several subframes. However, terminal devices can be configured to derive a further identifier based on an existing identifier. For example, a terminal device might be configured to establish a further identifier based on a modulo division of one of their existing identifiers. For example, a terminal device may establish a further identifier as N=I modulo P, where N is the further identifier, I is the existing identifier, and P is a predefined number corresponding to the number of different further identifiers that can be supported. Thus, a terminal device may establish it is associated with a given further identifier and, by reference to an established standard of the wireless telecommunications system, may determine that this further identifier associates the terminal device identity with a given subset of the reference symbols which may be suppressed. Thus, a number of different terminal devices connected to a base station can implicitly derive different identifiers that allow the base station to selectively activate the reduced activity mode based on the selective suppression of reference symbols. It will be appreciated that there will be a chance that multiple terminal devices will derive the same further identifier (and indeed this will be a certainty when there are more terminal devices then P connected to the base station). However, the base station can simply schedule sleep periods for terminal devices sharing the same further identifier at the same time.

Because embodiments of the invention can provide for relatively long duration suspensions/reduced activity mode (for example 10 ms or more), it is possible that channel conditions may be significantly different at expiry of reduced activity period as compared to the beginning of the reduced activity period. Accordingly, it can be advantageous in some examples for a terminal device to be configured to automatically determine and transmit a channel quality indicator (CQI) to the base station on exit from a period of reduced activity. In principle, a base station can configure a terminal device to force a CQI report through RRC signalling, but it can in some cases nonetheless be advantageous for the terminal device to automatically send a CQI report using its existing periodic CQI configuration to avoid delays and additional signalling overhead.

Furthermore, it is possible that a terminal device which has been controlled to enter a reduced activity mode for a period of time may need to transmit uplink data to the base station. Thus, a terminal device may be configured to exit the reduced activity mode and communicate this to the base station through conventional random access channel (RACH) or scheduling request (SR) signalling. In the case of the terminal device transmitting SR signalling, the terminal device could resume decoding VC-PDCCH in the next subframe to allow for the possibility of an immediate uplink grant being sent from the base station. In the case of the terminal device using the RACH procedure on a PRACH associated with the virtual carrier, the terminal device may remain in a reduced activity state, for example with reduced decoding of VC-PDCCH, until the start of the appropriate random access response (RAR) window, which may be several subframes later.

Figure 20:
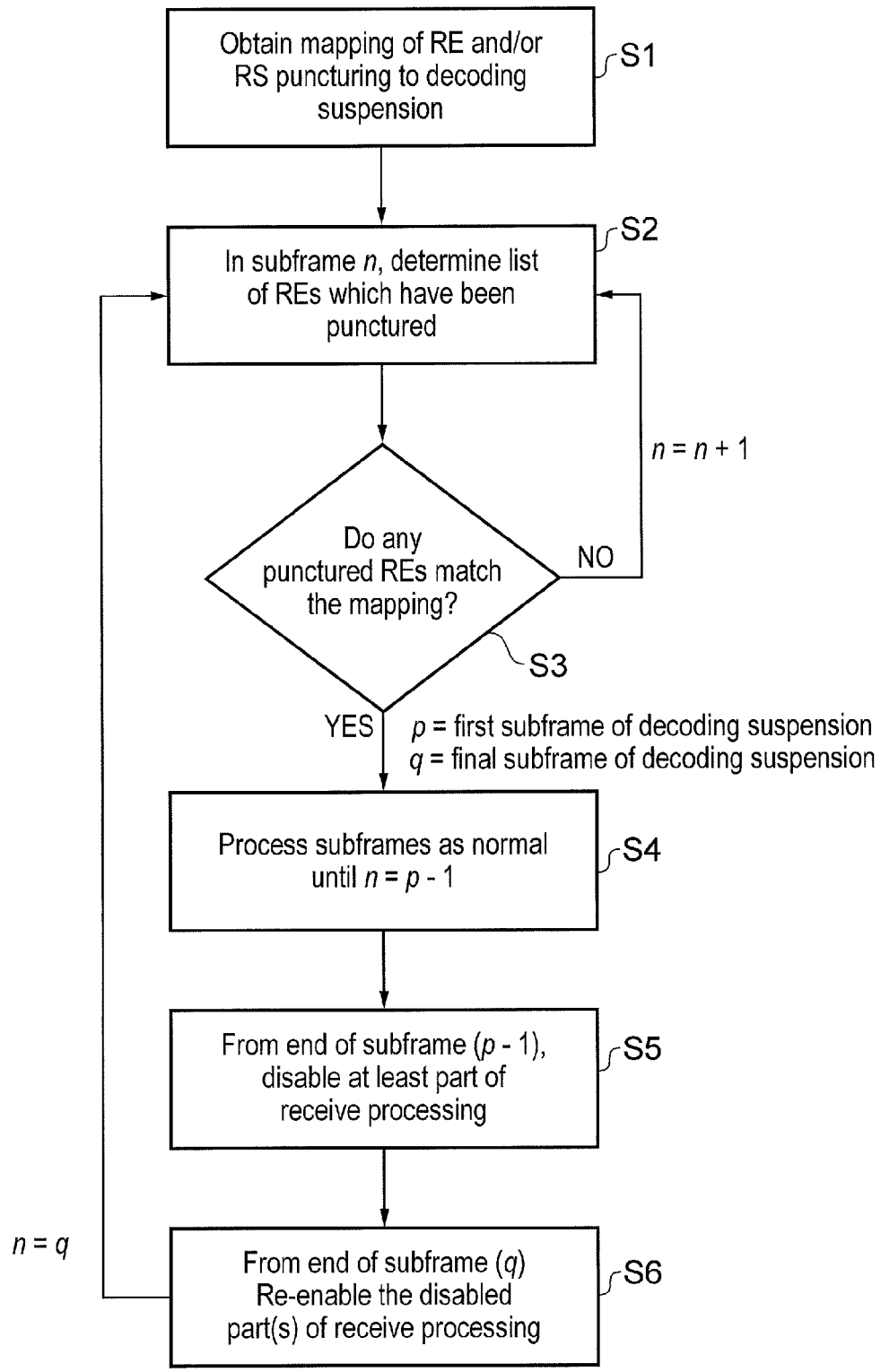
FIG. 20 is a flow diagram schematically representing processing in a terminal device in accordance with an embodiment of the invention.

FIG. 20 is a flow diagram schematically representing processing in a terminal device in accordance with an embodiment of the invention. In a first step S1 the terminal device establishes a mapping between reference symbols which may be suppressed and potential decoding suspension periods. This may be achieved in accordance with any of the above-identified techniques, such as through a standardised mapping/look-up table or through signalling from a base station, such as RRC signalling, or in SIB (system information block)/MIB (master information block) signalling. For example, wireless telecommunications standards associated with the system may specify a plurality of different potential look-up tables mapping different combinations of at least one resource element to different potential suspension durations, and SIB or MIB signalling may be used to indicate to a terminal device which table to use.

In a second step S2 the terminal monitors each subframe to determine the resource elements (RE) associated with reference symbols that have been suppressed (if any).

In a third step S3 the terminal device determines whether the resource elements associated with reference symbols that have been suppressed match any of the mappings which are relevant for the terminal device established in step S1. If it is determined there is no match, processing follows the branch marked "NO" back to step S2 for iterative the processing of the next subframe (subframe n+1) when it is received. If it is determined there is a match, the terminal device establishes a subframe p for starting decoding suspension and a subframe q for terminating decoding suspension based on the arrangement of at least one reference symbols for which transmission is determined to be suppressed. This can be done in accordance with any of the above-described techniques. For example, subframe p may be simply the next subframe (subframe n+1), and subframe q may be established by adding a period of time associated with the particular matched pattern of suppressed reference symbols to the time of subframe p. Processing then follows to step S4.

In step S4 the terminal device continues to process subframes as normal until subframe n=p−1 (in an example where p is simply the next subframe after the match identified in step S3, there will be no subframes processed in step S4 as the condition n=p−1 is immediately met).

In step S5 the terminal device operates in a reduced-activity mode in which at least part of the normal mode receive/decoding processing is disabled starting from subframe p.

In step S6 the terminal device determines that subframe q has been reached, e.g. based on an internal timer or based on subframe-based signalling that continues to be received in the reduced activity mode. This concludes the process of the base station controlling the reduced activity state of the terminal device for the defined period of time and processing returns to step S2.

It will be appreciated that various modifications can be made to the embodiments described above without departing from the scope of the present invention as defined in the appended claims. In particular although embodiments of the invention have been described with reference to an LTE mobile radio network, it will be appreciated that the present invention can be applied to other forms of network such as GSM, 3G/UMTS, CDMA2000, etc. The term MTC terminal as used herein can be replaced with user equipment (UE), mobile communications device, terminal device etc. Furthermore, although the term base station has been used interchangeably with eNodeB it should be understood that there is no difference in functionality between these network entities.

Thus, there has been described a wireless telecommunications system comprising a base station and a terminal device and employing a radio interface having a downlink radio frame structure comprising radio subframes including an arrangement of reference symbols for channel estimation. The base station is configured to determine a period of time for which certain terminal device specific data are not scheduled for transmission to the terminal device and to communicate this information to the terminal device through selective suppression of at least one reference symbol. Different reference symbol(s) may be suppressed to indicate different periods of time. The terminal device is configured to monitor the reference symbols transmitted by a base station to identify where reference symbols are suppressed. The terminal device may thus determine from which reference symbols are suppressed a period of time for which the terminal device is not expected to receive certain types of data and enter a reduced activity mode for that period to conserve processing and power resources. Puncturing reference symbols in this way provides for fast physical-layer signalling of periods during which the terminal device may conserve resources by decoding fewer transmissions than it might otherwise need to do.

Embodiments may comprise a method of operating a base station to convey to a terminal device information regarding a period of time for which a type of terminal device specific data is not scheduled for transmission to the terminal device in a wireless telecommunications system employing a radio interface having a downlink transmission structure including an arrangement of reference symbols the reference symbols comprising predefined signals in predefined time and frequency resources, the method comprising: determining a period of time for which terminal device specific data are not scheduled for transmission to a terminal device; selecting at least one reference symbol in at least one time and frequency resource in dependence on the determined period of time; and suppressing transmission of the at least one reference symbol in the at least one time and frequency resource to indicate to the terminal device the period of time for which the type of terminal device specific data are not scheduled for transmission to the terminal device.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] ETSI TS 122 368 V10.530 (2011-07)/3GPP TS 22.368 version 10.5.0 Release 10)
[2] UK patent application GB 1101970.0
[3] UK patent application GB 1101981.7
[4] UK patent application GB 1101966.8

[5] UK patent application GB 1101983.3
[6] UK patent application GB 1101853.8
[7] UK patent application GB 1101982.5
[8] UK patent application GB 1101980.9
[9] UK patent application GB 1101972.6
[10] UK patent application GB 1121767.6
[11] UK patent application GB 1121766.8

The invention claimed is:

1. A method of operating a terminal device in a wireless telecommunications system employing a radio interface including an arrangement of downlink reference symbols, the method comprising:
monitoring reference symbols transmitted by a base station;
identifying that transmission by the base station of at least one reference symbol from the arrangement of downlink reference symbols is suppressed;
determining a period of time for which to enter a reduced activity mode based on the identified at least one reference symbol for which transmission is suppressed; and
initiating the reduced activity mode for the determined period of time, wherein
the radio interface comprises a plurality of Orthogonal Frequency Division Multiplexing (OFDM) sub-carriers spanning a system frequency bandwidth,
the radio interface supports a first carrier for communicating with a first class of terminal device using a first group of the OFDM sub-carriers distributed across the system frequency bandwidth, and a second carrier for communicating with a second class of terminal device on a second group of the OFDM sub-carriers distributed across a restricted frequency bandwidth that is narrower than and within the system frequency bandwidth, and
the terminal device is a terminal device of the second class operating on the second carrier.

2. The method of claim 1, wherein the determined period of time for which to enter the reduced activity mode is based on an association between different ones of the reference symbols and different potential periods of time for entering the reduced activity mode.

3. The method of claim 2, wherein the association between different ones of the reference symbols and different potential periods of time for entering the reduced activity mode is pre-defined for the wireless telecommunications system.

4. The method of claim 2, wherein the association between different ones of the reference symbols and different potential periods of time for entering the reduced activity mode is communicated to the terminal device from the base station.

5. A method of operating a terminal device in a wireless telecommunications system employing a radio interface including an arrangement of downlink reference symbols, the method comprising:
monitoring reference symbols transmitted by a base station,
identifying that transmission by the base station of at least one reference symbol from the arrangement of downlink reference symbols is suppressed;
determining a period of time for which to enter a reduced activity mode based on the identified at least one reference symbol for which transmission is suppressed; and
initiating the reduced activity mode for the determined period of time, wherein
the determined period of time for which to enter the reduced activity mode is based on an association between different ones of the reference symbols and different potential periods of time for entering the reduced activity mode, and
the association between different ones of the reference symbols and different potential periods of time for entering the reduced activity mode is defined in a look-up table.

6. A method of operating a terminal device in a wireless telecommunications system employing a radio interface including an arrangement of downlink reference symbols, the method comprising:
monitoring reference symbols transmitted by a base station;
identifying that transmission by the base station of at least one reference symbol from the arrangement of downlink reference symbols is suppressed;
determining a period of time for which to enter a reduced activity mode based on the identified at least one reference symbol for which transmission is suppressed; and
initiating the reduced activity mode for the determined period of time, wherein
the at least one reference symbol for which transmission is suppressed comprises more than one reference symbol and the period of time for entering the reduced activity mode is determined according to a mapping between different combinations of reference symbols and a plurality of potential periods of time for entering the reduced activity mode.

7. A method of operating a terminal device in a wireless telecommunications system employing a radio interface including an arrangement of downlink reference symbols, the method comprising:
monitoring reference symbols transmitted by a base station;
identifying that transmission by the base station of at least one reference symbol from the arrangement of downlink reference symbols is suppressed;
determining a period of time for which to enter a reduced activity mode based on the identified at least one reference symbol for which transmission is suppressed; and
initiating the reduced activity mode for the determined period of time, wherein
the reference symbols are received on transmissions from multiple antenna ports of the base station and the determined period of time for entering the reduced activity mode is based on which antenna port is associated with the at least one reference symbol for which transmission is suppressed.

8. The method of claim 1, wherein the reference symbols comprise at least one of cell-specific reference symbols, terminal device specific reference symbols, demodulation reference symbols, channel state information reference symbols, or positioning reference symbols.

9. The method of claim 1, wherein a start time for the period of time for entering the reduced activity mode relative to a time at which the transmission of the at least one reference symbol is suppressed is also based on the at least one reference symbol for which transmission is suppressed.

10. The method of claim 1, further comprising determining at least one further period of time for which to enter a reduced activity mode based on the identified at least one reference symbol for which transmission is suppressed.

11. The method of claim 10, wherein the determined period of time and at least one further period of time follow a pattern defined according to the at least one reference symbol for which transmission is suppressed.

12. The method of claim 1, further comprising determining to enter the reduced activity mode for a period of time based on a correspondence between an identifier for the terminal device and an identity associated with the at least one reference symbol for which transmission is suppressed.

13. The method of claim 12, wherein the identity associated with the at least one reference symbol for which transmission is suppressed uniquely identifies the terminal device.

14. The method of claim 12, wherein the identity associated with the at least one reference symbol for which transmission is suppressed identifies a group of terminal devices of which the terminal device is a member.

15. The method of claim 14, wherein an association between the terminal device and the group of terminal devices of which the terminal device is a member is established by signalling between the base station and the terminal device.

16. The method of claim 14, wherein an association between the terminal device and the group of terminal devices of which the terminal device is a member is pre-defined for the wireless telecommunications system.

17. The method of claim 1, wherein the at least one reference symbol is identified as being suppressed based on it not being received or being received with less power than other reference symbols.

18. The method of claim 1, wherein the radio interface has a downlink radio frame structure comprising radio sub-frames.

19. The method of claim 18, wherein the period of time corresponds with a number of subframes starting at an offset defined relative to a subframe in which a reference symbol is suppressed.

20. The method of claim 18, wherein the at least one reference symbol for which transmission is suppressed comprises at least one reference symbol in each one of more than one subframe.

21. The method of claim 1, further comprising deriving further information communicated from the base station to the terminal device based on the at least one reference symbol for which transmission is suppressed.

22. The method of claim 1, further comprising the terminal device transmitting signaling to the base station during the reduced activity mode to request resources for subsequent communications between the base station and the terminal device.

23. The method of claim 1, further comprising the terminal device transmitting a channel quality indicator, CQI, to the base station on exit from the reduced activity mode.

24. The method of claim 1, wherein the reduced activity mode is a mode in which the terminal device is configured to decode fewer transmissions from the base station than when the terminal device is not in the reduced activity mode.

25. The method of claim 1, wherein the terminal device continues to decode at least one of synchronisation information, system information, or reference symbols when in the reduced activity mode.

26. A terminal device for use in a wireless telecommunications system employing a radio interface including an arrangement of downlink reference symbols, the terminal device comprising:
a communication interface configured to receive reference symbols transmitted by a base station; and
circuitry configured to
identify that transmission by the base station of at least one reference symbol from the arrangement of downlink reference symbols is suppressed;
determine a period of time for which to enter a reduced activity mode based on the identified at least one reference symbol for which transmission is suppressed; and
initiate the reduced activity mode for the determined period of time, wherein
the radio interface comprises a plurality of Orthogonal Frequency Division Multiplexing (OFDM) sub-carriers spanning a system frequency bandwidth,
the radio interface supports a first carrier for communicating with a first class of terminal device using a first group of the OFDM sub-carriers distributed across the system frequency bandwidth, and a second carrier for communicating with a second class of terminal device on a second group of the OFDM sub-carriers distributed across a restricted frequency bandwidth that is narrower than and within the system frequency bandwidth, and
the terminal device is a terminal device of the second class operating on the second carrier.

27. The terminal device of claim 26, configured such that the determined period of time for which to enter the reduced activity mode is based on an association between different ones of the reference symbols and different potential periods of time for entering the reduced activity mode.

28. The terminal device of claim 26, wherein the association between different ones of the reference symbols and different potential periods of time for entering the reduced activity mode is pre-defined for the wireless telecommunications system.

29. The terminal device of claim 26, wherein the association between different ones of the reference symbols and different potential periods of time for entering the reduced activity mode is communicated to the terminal device from the base station.

30. A terminal device for use in a wireless telecommunications system employing a radio interface including an arrangement of downlink reference symbols, the terminal device comprising:
a communication interface configured to receive reference symbols transmitted by a base station, and
circuitry configured to
identify that transmission by the base station of at least one reference symbol from the arrangement of downlink reference symbols is suppressed;
determine a period of time for which to enter a reduced activity mode based on the identified at least one reference symbol for which transmission is suppressed; and
initiate the reduced activity mode for the determined period of time, wherein
the determined period of time for which to enter the reduced activity mode is based on an association between different ones of the reference symbols and different potential periods of time for entering the reduced activity mode, and
the association between different ones of the reference symbols and different potential periods of time for entering the reduced activity mode is defined in a look-up table.

31. A terminal device for use in a wireless telecommunications system employing a radio interface including an arrangement of downlink reference symbols, the terminal device comprising:
  a communication interface configured to receive reference symbols transmitted by a base station; and
  circuitry configured to
    identify that transmission by the base station of at least one reference symbol from the arrangement of downlink reference symbols is suppressed;
    determine a period of time for which to enter a reduced activity mode based on the identified at least one reference symbol for which transmission is suppressed; and
    initiate the reduced activity mode for the determined period of time, wherein
  the at least one reference symbol for which transmission is suppressed comprises more than one reference symbol and wherein the terminal device is configured such that the period of time for entering the reduced activity mode is determined according to a mapping between different combinations of reference symbols and a plurality of potential periods of time for entering the reduced activity mode.

32. A terminal device for use in a wireless telecommunications system employing a radio interface including an arrangement of downlink reference symbols, the terminal device comprising:
  a communication interface configured to receive reference symbols transmitted by a base station; and
  circuitry configured to
    identify that transmission by the base station of at least one reference symbol from the arrangement of downlink reference symbols is suppressed;
    determine a period of time for which to enter a reduced activity mode based on the identified at least one reference symbol for which transmission is suppressed; and
    initiate the reduced activity mode for the determined period of time, wherein
  the communication interface is configured to receive the reference symbols on transmissions from multiple antenna ports of the base station, and
  the circuitry is configured to determine the period of time for entering the reduced activity mode based on which antenna port is associated with the at least one reference symbol for which transmission is suppressed.

33. The terminal device of claim 26, wherein the reference symbols comprise at least one of cell-specific reference symbols, terminal device specific reference symbols, demodulation reference symbols, channel state information reference symbols, or positioning reference symbols.

34. The terminal device of claim 26, configured such that a start time for a period of time for entering the reduced activity mode relative to a time at which the transmission of the at least one reference symbol is suppressed is also determined based on the at least one reference symbol for which transmission is suppressed.

35. The terminal device of claim 26, further configured to determine at least one further period of time for which to enter a reduced activity mode based on an identified at least one reference symbol for which transmission is suppressed.

36. The terminal device of claim 35, wherein the determined period of time and at least one further period of time follow a pattern defined according to the at least one reference symbol for which transmission is suppressed.

37. The terminal device of claim 26, further configured to determine to enter the reduced activity mode for a period of time based on a correspondence between an identifier for the terminal device and an identity associated with the at least one reference symbol for which transmission is suppressed.

38. The terminal device of claim 37, wherein the identity associated with the at least one reference symbol for which transmission is suppressed uniquely identifies the terminal device.

39. The terminal device of claim 37, wherein the identity associated with the at least one reference symbol for which transmission is suppressed identifies a group of terminal devices of which the terminal device is a member.

40. The terminal device of claim 39, configured such that an association between the terminal device and the group of terminal devices of which the terminal device is a member is established by signalling between the base station and the terminal device.

41. The terminal device of claim 39, wherein an association between the terminal device and the group of terminal devices of which the terminal device is a member is predefined for the wireless telecommunications system.

42. The terminal device of claim 26, configured such that the at least one reference symbol is identified as being suppressed based on it not being received or being received with less power than other reference symbols.

43. The terminal device of claim 26, wherein the radio interface has a downlink radio frame structure comprising radio subframes.

44. The terminal device of claim 43, wherein the period of time corresponds with a number of subframes starting at an offset defined relative to a subframe in which a reference symbol is suppressed.

45. The terminal device of claim 43, wherein the at least one reference symbol for which transmission is suppressed comprises at least one reference symbol in each one of more than one subframe.

* * * * *